United States Patent
Alidedeoglu et al.

(10) Patent No.: US 10,377,854 B2
(45) Date of Patent: Aug. 13, 2019

(54) CONTINUOUS PROCESS FOR MAKING POLYBUTYLENE TEREPHTHALATE

(71) Applicant: SABIC Global Technologies B.V., Bergen op Zoom (NL)

(72) Inventors: Husnu Alp Alidedeoglu, Mt. Vernon, IN (US); Prashant Kumar, Mt. Vernon, IN (US); Osit Karroonnirun, Evansville, IN (US); Mark Erik Nelson, Mt. Vernon, IN (US); Donald E. Owens, III, Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 4 days.

(21) Appl. No.: 15/326,665

(22) PCT Filed: Aug. 4, 2015

(86) PCT No.: PCT/US2015/043542
§ 371 (c)(1),
(2) Date: Jan. 17, 2017

(87) PCT Pub. No.: WO2016/025228
PCT Pub. Date: Feb. 18, 2016

(65) Prior Publication Data
US 2017/0204219 A1    Jul. 20, 2017

Related U.S. Application Data

(60) Provisional application No. 62/037,876, filed on Aug. 15, 2014.

(51) Int. Cl.
*B01J 19/18* (2006.01)
*C08G 63/78* (2006.01)

(52) U.S. Cl.
CPC ........ *C08G 63/785* (2013.01); *B01J 19/1862* (2013.01); *B01J 2219/1941* (2013.01)

(58) Field of Classification Search
CPC .......... B01J 19/1862; B01J 2219/1941; C08G 63/785
See application file for complete search history.

(56) References Cited

U.S. PATENT DOCUMENTS

| | | | | |
|---|---|---|---|---|
| 4,289,895 A | * | 9/1981 | Burkhardt | B01J 19/1862 560/92 |
| 4,656,241 A | * | 4/1987 | Iida | C08G 63/85 528/279 |
| 5,064,935 A | * | 11/1991 | Jackson | C08G 63/78 528/272 |
| 5,663,281 A | * | 9/1997 | Brugel | C08G 63/80 528/176 |
| 5,786,443 A | * | 7/1998 | Lowe | C07C 67/08 526/67 |
| 5,811,496 A | * | 9/1998 | Iwasyk | B01J 3/042 525/437 |
| 5,962,625 A | * | 10/1999 | Yau | C08G 63/866 524/706 |
| 6,657,040 B1 | * | 12/2003 | Heitz | C08G 63/78 526/65 |
| 6,706,396 B1 | * | 3/2004 | Hayes | B29B 9/06 428/402 |
| 7,204,962 B2 | * | 4/2007 | Nakamoto | C08G 63/78 422/134 |
| 2002/0028904 A1 | * | 3/2002 | Dhawan | C08G 63/78 528/176 |
| 2009/0240007 A1 | | 9/2009 | Wilhelm et al. | |

FOREIGN PATENT DOCUMENTS

WO    9622318 A1    7/1996
WO    0100704 A1    1/2001

OTHER PUBLICATIONS

R. R. Gallucci et al "Poly(Butylene Terephthalate)", Modern polyesters, Ch.8 2003.*
International Search Report dated Oct. 26, 2015; International Application No. PCT/US2015/043542; International Filing Date Aug. 4, 2015 (3 pages).
Written Opinion dated Oct. 26, 2015; International Application No. PCT/US2015/043542; International Filing Date Aug. 4, 2015 (5 pages).

* cited by examiner

*Primary Examiner* — Ling Siu Choi
*Assistant Examiner* — Gennadiy Mesh
(74) *Attorney, Agent, or Firm* — Cantor Colburn LLP

(57) ABSTRACT

A process for preparing polybutylene terephthalate (PBT) which includes step of melting solid PBT oligomer having an IV of between 0.13 and 0.17 dL/g and a CEG of between 90 and 180 mmol/kg; and further step of the PBT oligomer polycondensation; wherein the polycondensation process is carried out continuously using a melt tank for melting oligomers, one or more reactors for post-condensation processing, and one or more finishing reactors to increase molecular weight. The resulting PBT has an intrinsic viscosity (IV) of between 0.5 and 1.3 dl/g and a carboxylic end group (CEG) concentration of between 1 and 75 mmol/kg.

14 Claims, 7 Drawing Sheets

(a)

(b)

(a)                                    (b)

CONTINUOUS PROCESS FOR MAKING POLYBUTYLENE TEREPHTHALATE

CROSS-REFERENCE TO RELATED APPLICATIONS

This application is a National Stage application of PCT/US2015/043542, filed Aug. 4, 2015, which claims the benefit of U.S. Provisional Application No. 62/037,876, filed Aug. 15, 2014, both of which are incorporated by reference herein in their entirety.

FIELD OF THE INVENTION

Disclosed is a continuous process for making polybutylene terephthalate (PBT) resin. The resin is prepared from oligomers of purified terephthalic acid (PTA) and 1,4-butane diol (BDO) in the presence of a catalyst.

BACKGROUND OF THE INVENTION

Polybutylene terephthalate (PBT) resins are semicrystalline thermoplastics used in a variety of durable goods. PBT resins are now widely used for components in the electronics and automotive industries. As these market sectors continue to expand and evolve, demand for PBT has continued to grow. Thus, in 2009, worldwide consumption of PBT was reported to total 750 kilotons. Demand for PBT is projected to increase at least 5 percent per year, leading to a projected demand of 1300 kilotons by the year 2020.

PBT producers continue to face the challenge of meeting increasing demand for PBT while dealing with higher production costs. One approach to improving process yield and reducing cost on an industrial scale relates to using PBT oligomer to make PBT resins. PBT oligomer can be prepared from PTA and BDO. To be useful in making PBT resin for specific end purposes, it is necessary to strictly control the CEG and IV values of the PBT oligomer. There is thus an ongoing need for processes for making PBT resins from PBT oligomer with desired IV and CEG values.

SUMMARY OF THE INVENTION

These and other needs are met by the present invention which is directed to a process for making polybutylene terephthalate (PBT) resin, comprising polycondensation of PBT oligomer; wherein:

the polycondensation process is carried out continuously using equipment comprising: a melt tank for melting oligomers, one or more reactors for post-condensation processing, and one or more finishing reactors to increase molecular weight; and wherein:

the resulting PBT has an intrinsic viscosity (IV) of between 0.5 and 1.3 dl/g and a carboxylic end group (CEG) concentration of between 1 and 75 mmol/kg.

The Applicants have surprisingly and unexpectedly found that a complex combination of variables ranging from trans-esterification temperature, trans-esterification pressure, residence time, reactor level, finisher volume surface ratio, catalyst concentration, and additional BDO amount determines the IV and CEG PBT resin prepared by the process.

The advantages of the new process include reduced energy consumption needed to produce the PBT as well as the generation of PBT resins with lower variable cost of manufacturing. In addition, using PTA instead of DMT to make PBT has been shown to give rise to highly pure tetrahydrofuran (THF), a by-product of the PBT synthesis process with commercial and strategic downstream value.

DETAILED DESCRIPTION OF THE INVENTION

Figure 1:
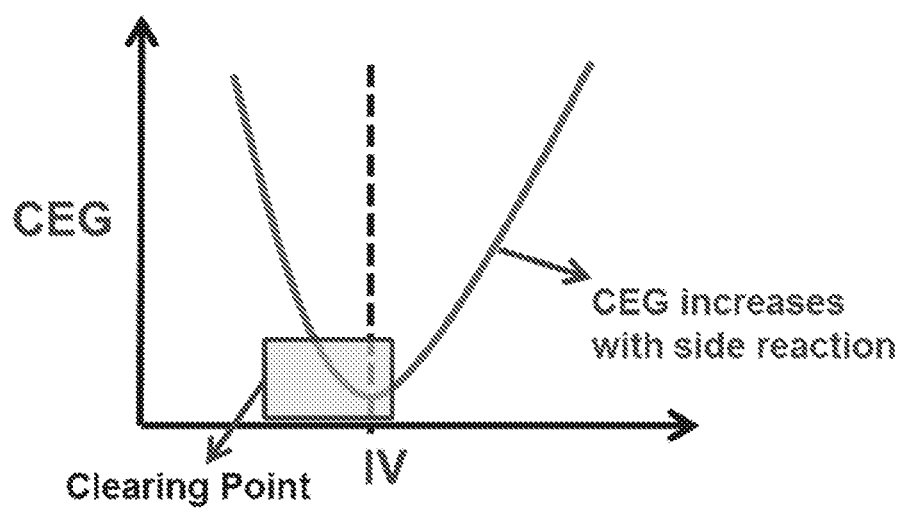
FIG. 1 depicts the kinetics of the PTA-based PBT polymer process.

If a term in the present application contradicts or conflicts with a term in a reference, the term in the present application takes precedence over the conflicting term from the reference. All ranges disclosed herein are inclusive of the endpoints, and the endpoints are independently combinable with each other. The use of the terms "a" and "an" and "the" and similar referents in the context of describing the invention (especially in the context of claims) are to be construed to cover both the singular and the plural, unless otherwise indicated herein or clearly contradicted by context. It should further be noted that the terms "first," "second," and the like herein do not denote any order, quantity, or importance, but rather are used to distinguish one element from another. The modifier "about" used in connection with a quantity is inclusive of the stated value and has the meaning dictated by the context (that is, it includes the degree of error associated with measurement of the particular quantity). As used herein all percent by weights are based on the total weight of the composition.

In the process disclosed herein, PBT resin is prepared from PBT oligomer. PBT oligomer is typically prepared by reacting terephthalic acid with 1,4-butane diol (BDO) in the presence of a catalyst. Various grades of terephthalic acid may be used, but purified terephthalic acid (PTA) is preferred. Purified PTA is commercially available from a number of vendors and typically contains 10 percent of less of impurities as measured using conventional techniques.

Typically, BDO and PTA are combined in a molar ratio of 6:1 to 2:1 in the presence of a catalyst. More particularly, BDO and TA are combined in a molar ratio of 4.25:1 to 2.95:1 in the presence of TPT. As an example, to achieve an IV of approximately 0.13-0.17 dl/g and a CEG of between 90 and 180 mmol/kg, a BDO to PTA ratio of 3:1 is employed. Alternatively, to achieve an IV of 0.25-0.43 dl/g and a CEG of lower than 20 mmol/kg, a BDO to PTA ratio of 4:1 is employed. The molar ratio of BDO to PTA will vary depending on the desired IV and CEG of the resulting PBT oligomer.

Many catalysts have been identified and can be used in the process, but a particularly preferred catalyst is tetraisopropyl titanate (TPT).

To make PBT oligomer, the components BDO, PTA, and TPT are combined and heated to a temperature of approximately 160° C. to 180° C. When the temperature of the reaction mixture is in the range of approximately 160° C. to 180° C., the temperature is gradually raised to approximately 220° C. to 265° C. Ester interchange occurs at approximately approximately 230° C. to 260° C., and is complete when the clearing point is reached based on visual inspection. As used herein the "clearing point" occurs when the reaction medium becomes homogeneous melt. After the clearing point is reached, the pressure is optionally adjusted reduced to about 50 to 760 mm Hg and the temperature is maintained at about approximately 230° C. to 260° C. for sufficient time to achieve desired IV and CEG values in the resulting PBT oligomer. At the completion of the reaction, the pressure is returned to atmospheric pressure and the polymer is analyzed. The resulting PBT oligomer can be cooled to a solid, then flaked, powdered, or pelletized, and used to make PBT resin.

PBT resin can be prepared from PBT oligomer on a lab scale. The PBT oligomer is introduced into a three-neck round bottom flask and the flask is placed in an oil bath with the temperature adjusted to approximately 230° C. to 260° C., to melt the PBT oligomer. The PBT oligomer is typically melted at that temperature in 10 minutes while stirring at 260 rpm under nitrogen. At this stage, additional BDO and/or TPT may optionally be added. After achieving a complete melt, the polymerization stage is conducted at the same temperature with the vacuum adjusted to less than 1 mm Hg for approximately 30 minutes. The reaction is stopped, the pressure is increased to atmospheric pressure, and the polymer sample is obtained for IV and CEG analysis.

Figure 7:
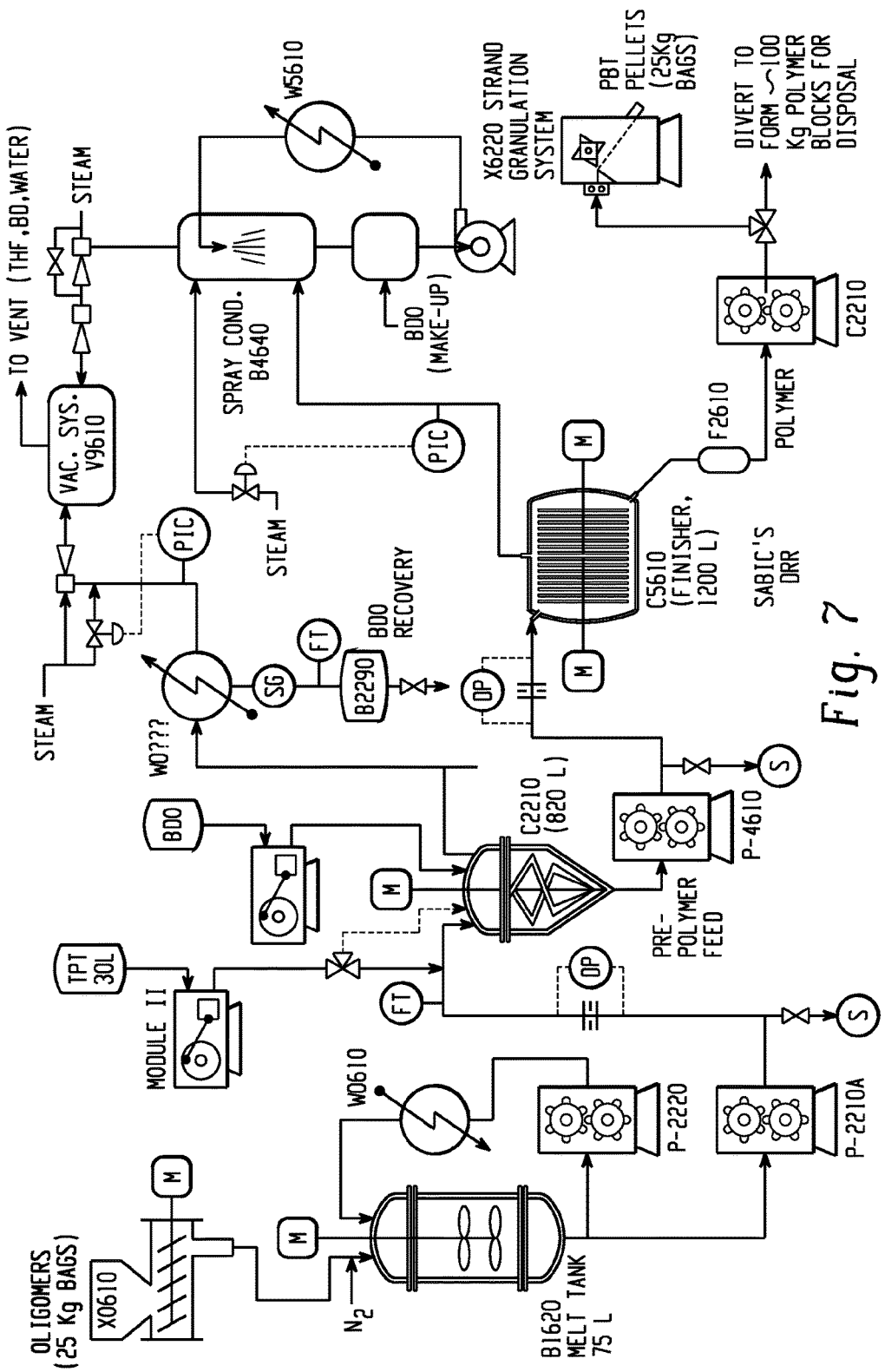
FIG. 7 shows a flow diagram of a continuous process for making PBT from PBT oligomer.

On a pilot plant or larger industrial scale, PBT resin can be prepared from PBT oligomer via a continuous process as depicted in FIG. 7. A continuous process for making PBT resin on an industrial scale typically requires an oligomer feeder where PBT oligomer is loaded as a solid, typically as flaked, pelletized or powdered oligomer. Alternatively, oligomer can be fed into the continuous processor as it is being produced, by employing a water slide pelletizer, strand pelletizer, or underwater pelletizer.

Typically the oligomer is loaded, for instance, as 25 kg bags of flaked, pelletized or powdered oligomer having an IV of between 0.1 and 0.35 dL/g and a CEG of between 10 and 400 mmol/kg.

As disclosed herein, the polycondensation of PBT oligomer to make PBT with specified IV and CEG is carried out continuously using industrial-scale equipment comprising a melt tank for melting oligomers, one or more reactors for post-condensation processing, and one or more finishing reactors to increase molecular weight. The components of the industrial processor are readily known to the skilled practitioner. For example, the melt tank for melting the PBT oligomer can be selected from the group consisting of a melt tank reactor, a melt tank extruder with or without internal screw conveying, and a conveying melt tube. The reactor for post condensation processing is ideally a reactor that can be operated at steady state and where the temperature and concentration are identical everywhere within the reactor as well as at the exit point. Typically the reactor is a continuous stirred tank reactor (CSTR). The finishing reactor is a disc ring reactor (DRR) or disc cage reactor or the like, design examples of which include Megan examples and Koushi examples and from manufacturers such as Hitachi, Sumitomo. One finishing reactor can be used or a combination of finishing reactors can be used in series in the process.

Thus, in one embodiment, the processor comprises a melt tank with agitation reactor for melting the oligomer, a continuously stirred tank reactor (CSTR) for post condensation processing, and a disc ring reactor (DRR) to increase the molecular weight of the PBT.

In the process, the PBT oligomer is fed as a flaked, powdered or pelletized solid into the melt tank reactor where it is heated until it is melted to achieve a flowable melt. The melted PBT oligomer is then transferred via a transfer pipe to a continuous stirred tank reactor (CSTR), which is additionally equipped with TPT and BDO feedlines. The PBT oligomer is then transferred via transfer pipe to a disc ring reactor (DRR) where it is finished. More specifically, in a continuous process, solid pelletized PBT oligomer having the desired IV and CEG is used. For example, the PBT oligomer has an IV of between approximately 0.1 and 0.35 dL/g, and thus between approximately 0.1 and 0.25 dL/g, or between approximately 0.13 and 0.17 dL/g or between approximately 0.17 and 0.25 dL/g or between approximately 0.25 and 0.35 dL/g. Typically the IV is between 0.13 and 0.17 dL/g. The CEG is less than mmol/kg. For example, the CEG is less than 10 mmol/kg, or is between 90 and 180 mmol/kg, or between or 100 and 220 mmol/kg or between 50 and 400 mmol/kg.

The oligomer is thus loaded into the feeder and then the melt tank. The PBT oligomer is converted into a melt in the melt tank by heating at between approximately 220 and 250° C., and 1000 mbar. Depending on the scale, in some embodiments, the resulting melt has a flow rate between approximately about 50 and 111 kg/hr and the process volume fluctuates between approximately 15 and 62 L. In other embodiments, the residence time in the melt tank is between approximately 0.20 hour for high flow and 1.5 hours for low flow. In another embodiment, the residence time in the melt tank is 0.61 kg/hour for high flow and 1.36 kg/hour for low flow.

The melt is transferred to the CSTR via a process flow line which is a transfer pipe. The process flow line is equipped with a capillary pressure drop viscometer which monitors online the IV of the melt oligomer feeding into the CSTR. The pipeline melt temperature is desirably kept between approximately 220 and 270° C. and a pressure in the transfer line is approximately 10 mbars. Depending on the scale, in some embodiments, the flow rate fluctuates between approximately 50 at low flow and 111 kg/hr at high flow.

As the melted oligomer is fed into the CSTR, the melt temperature is adjusted to between approximately 225 and 270° C., the pressure is kept between approximately 40 mbar and 5 mbar, and the residence time is varied between 3 and 6.6 hours. Depending on the scale, in some embodiments, the residence time is between 40 and 150 minutes. The CSTR is additionally equipped with a flow meter on the overhead from the CSTR to measure the reaction progress coupled with a feedback loop controlling optionally the temperature, absolute pressure, the level of the CSTR, and/or the addition of catalyst or BDO to achieve the desired IV and acid number of the CSTR product. The CSTR is also preferably outfitted with a viscometer located in the slipstream of the main product flow to afford online viscosity measurement. Online viscosity measurement on the CSTR product, coupled with a feedback loop controlling the temperature, absolute pressure, the level of the CSTR, and/or the addition of catalyst or BDO make it possible to achieve the targeted IV and acid number of the CSTR product in real time.

As indicated, in one embodiment, the melt temperature in the CSTR is approximately 225 and 270° C. and the pressure is adjusted to between approximately 40 and 5 mbar, with a residence time of between approximately 40 and 150 minutes. Within these parameters, IV is maintained at between 0.30 and 0.35 dL/g and CEG is maintained at between approximately 8 and 30 mmol/kg, as provided by the following table.

| Entry # | Reactor Temp (° C.) | Pressure (milibar) | Time (min) | IV (dl/g) | CEG (mmol/kg) |
|---|---|---|---|---|---|
| 1 | 240 | 13 | 79 | 0.33 | 27 |
| 2 | 240 | 23 | 99 | 0.33 | 23 |
| 3 | 226 | 13 | 159 | 0.32 | 10 |

As provided herein, IV and CEG depend on both temperature and pressure. The above table shows how temperature and pressure effect IV, CEG and residence time. Entry 1 and 2 show the pressure effect to the residence time to build the same IV and similar CEG. Entry 1 and 3 show the effect of temperature to CEG, lower temperature results in longer reaction time and lower CEG; that is, 10 mmol/kg. By varying pressure and temperature the targeted IV and CEG can be obtained.

A second process flow line which is a transfer pipe transfers melted PBT oligomer from the CSTR into the DRR. The process flow line is equipped with a capillary pressure drop viscometer which monitors online the IV of the melt oligomer feeding to the DRR. The pipeline melt temperature is typically between approximately 230 and 270° C. In some embodiments, the pressure in the transfer line is approximately 15 mbars and the flow rate is between approximately 50 and 111 kg/hr.

Finally, PBT resins are produced continuously in DRR reactor. The PBT melt temperature is kept between 230 and 270° C. The reactor pressure varies between 0.8 and 5 mbar for different grades. The flow rate varies between approximately 50 and 111 kg/hr. Depending on the scale, in some embodiments, total residence time based on grades varies between approximately 4.3 and 9.6 hours. The DRR is ideally capable of producing PBT with an IV of greater than 0.55 dl/g and a CEG of between approximately 5 and 55 mmol/Kg. Such a DRR would typically have a two shaft reactor with the first shaft having more disc rings than the second shaft, where each of the shafts operate at two different rpm. For example, in an embodiment, the first shaft of the DRR has 6 disc rings and typically rotates at approximately 4 to 10 rpm and the second shaft has 3 or 4 disc rings and rotates at approximately 2.2 to 5 rpm.

In another embodiment the DRR has two shafts with the first shaft having more disc rings than the second shaft, where each of the shafts operates at two different rpm. In this embodiment, the first shaft of the DRR has 6 disc rings and the second shaft has 3 or 4 disc rings. Typically, the first shaft rotates at 4 to 10 rpm and has a tip speed between 0.40 and 0.70 m/s and the distance between the rings of the first shaft is between approximately 60 and 90 mm. The second shaft rotates at 2.2 to 5.5 rpm and has a tip speed between 0.20 and 0.50 m/s, and the distance between the rings of the second shaft is between approximately 100 and 130 mm.

The DRR is preferably outfitted with a viscometer located in the slipstream of the main product flow to afford online viscosity measurement. Online viscosity measurement on the CSTR product. The use of online viscosity measurement on the DRR product coupled with a feed-back loop controlling optionally the temperature, absolute pressure, and the level of the DRR BDO make it possible to achieve the targeted IV and acid number of the DRR product in real time.

In another embodiment, the PBT is produced continuously in the DRR, wherein the PBT melt temperature in the DRR is kept between approximately 230 and 270° C., the pressure varies between approximately 0.8 and 5 mbar, the average volume fill is between approximately 10 and 35 percent, and the total residence time of the PBT in the processor is between approximately 4.3 and 15 hours.

In an additional embodiment, the DRR produces PBT with an IV of greater than approximately 0.55 dl/g and a CEG of between approximately 5 and 75 mmol/kg, a residence time in the DRR ranging from approximately 78 minutes up to 240 minutes, and a process In another embodiment, the continuous process described herein is capable of producing PBT having an IV of greater than approximately 0.55 dl/g and a CEG of between approximately 5 and 55 mmol/kg with a residence time in the DRR, depending on the PBT grade, ranging from approximately 78 minutes up to 180 minutes and a process throughput from approximately 60 to 111 kg/hr.

In another aspect, the invention provides a processor for preparing PBT by polycondensing oligomers of terephthalic acid (PTA) with 1,4-butane diol (BDO) in the presence of tetraisopropyl titanate; wherein the processor comprises a melt reactor, continuous stirred tank reactor, and disc ring reactor; wherein:

the polycondensation process is carried out continuously using the melt reactor for melting the oligomers, the continuous stirred tank reactor (CSTR) for post-condensation processing, and the disc ring reactor (DRR) finisher to increase molecular weight; and wherein:

the resulting PBT has an intrinsic viscosity (IV) of between 0.5 and 1.2 mmol/kg and carboxylic end group (CEG) concentration of between 1 and 75 mmol/kg.

EMBODIMENTS

The invention is also embraced by the following embodiments.

Embodiment 1

A process for preparing polybutylene terephthalate (PBT), comprising polycondensation of PBT oligomer; wherein the polycondensation process is carried out continuously using equipment comprising: a melt tank for melting oligomers, one or more reactors for post-condensation processing, and one or more finishing reactors to increase molecular weight; and wherein:

the resulting PBT has an intrinsic viscosity (IV) of between 0.5 and 1.3 dl/g and a carboxylic end group (CEG) concentration of between 1 and 75 mmol/kg.

Embodiment 2

The process of embodiment 1, wherein the equipment comprises a melt tank with agitation reactor for melting the oligomer, a continuously stirred tank reactor (CSTR) for post condensation processing, and a disc ring reactor (DRR) to increase the molecular weight of the PBT.

Embodiment 3

The process of embodiment 2, wherein the PBT oligomer is added to the melt tank as solid PBT oligomer, wherein the solid PBT oligomer is pelletized, powdered or flaked, and has an IV of between 0.1 and 0.35 dL/g and a CEG of between 10 and 400 mmol/kg, preferably between 5 and 400 mmol/kg.

Embodiment 4

The process of embodiment 3, wherein the flaked PBT oligomer is melted to form a melt by heating the melt reactor to between approximately 220 and 250° C. and approximately 1000 mbar, and wherein the resulting melted PBT oligomer has a residence time in the melt tank of between 0.2 and 1.5 hour.

Embodiment 5

The process of embodiment 4, wherein the PBT melt is transferred using a transfer pipe to the CSTR, wherein the pipeline melt temperature is between approximately 220 and 270° C., a pressure of approximately 10 mbars.

Embodiment 6

The process of embodiment 5, wherein the melt temperature in the CSTR is approximately 225 and 270° C. and the pressure is adjusted to between approximately 40 and 5 mbar and the residence time of the PBT is between 40 and 150 minutes.

Embodiment 7

The process of embodiment 6, wherein the catalyst and optionally BDO are added to the CSTR.

Embodiment 8

The process of embodiment 7, wherein the catalyst is TPT.

Embodiment 9

The process of embodiment 8, wherein the contents of the CSTR are transferred using a transfer pipe to the DRR, wherein the pipeline melt temperature is between approximately 230 and 270° C.

Embodiment 10

The process of embodiment 9, wherein the DRR has two shafts with the first shaft having more disc rings than the second shaft, where shafts operate at different rpm Embodiment 11

The process of embodiment 10, wherein the first shaft of the DRR has 6 disc rings and the second shaft has 3 or 4 disc rings.

Embodiment 12

The process of embodiment 10, wherein the first shaft rotates at 4 to 10 rpm and has a tip speed between 0.40 and 0.70 m/s and the distance between the rings of the first shaft is between approximately 60 and 90 mm; and the second shaft rotates at 2.2 to 5.5 rpm and has a tip speed between 0.20 and 0.50 m/s, and the distance between the rings of the second shaft is between approximately 100 and 130 mm.

Embodiment 13

The process of embodiment 12, wherein PBT is produced continuously in the DRR, wherein the PBT melt temperature in the DRR is kept between approximately 230 and 270° C., the pressure varies between approximately 0.8 and 10 mbar, preferably between approximately 0.8 and 5 mbar, the average volume fill is between approximately 10 and 35 percent, and the total residence time of the PBT in the processor is between approximately 4.3 and 15 hours.

Embodiment 14

The process of embodiment 13, wherein the DRR produces PBT with an IV of greater than approximately 0.55 dl/g and a CEG of between approximately 5 and 75 mmol/kg, a residence time in the DRR ranging from approximately 78 minutes up to 240 minutes, and a process throughput from approximately 60 to 111 kg/hr that is equivalent to a DRR average volume fill equal to approximately 10 and 35 percent.

Embodiment 15

A processor for preparing PBT by polycondensing oligomers of terephthalic acid (PTA) with 1,4-butane diol (BDO) in the presence of tetraisopropyl titanate; wherein the processor comprises a melt reactor, continuous stirred tank reactor, and disc ring reactor; wherein:
the polycondensation process is carried out continuously using the melt reactor for melting the oligomers, the continuous stirred tank reactor (CSTR) for post-condensation processing, and the disc ring reactor (DRR) finisher to increase molecular weight; and wherein:
the resulting PBT has an intrinsic viscosity (IV) of between 0.5 and 1.2 mmol/kg and carboxylic end group (CEG) concentration of between 1 and 75 mmol/kg.

Embodiment 16

The processor of embodiment 15, as depicted in FIG. 7.
The invention is further described in the following illustrative examples in which all parts and percentages are by weight unless otherwise indicated.

EXAMPLES

The following examples illustrate the scope of the invention. The examples and preparations which follow are provided to enable those skilled in the art to more clearly understand and to practice the present invention. They should not be considered as limiting the scope of the invention, but merely as being illustrative and representative thereof.

Example 1: IV and CEG Optimization in PBT Oligomer Preparation

Materials
1-4-Butanediol (BDO), Purity: 99.5% by weight, Purchased from BASF
Tetraisopropyl titanate (TPT) catalyst, Commercial Tyzor grade available from Dorse Ketal
Dimethyl terephthalate (DMT), Purchased from INVISTA
Purified Terephtalic Acid (PTA), Purchased from Eastman Equipment
A 10 CV (Cone Vertical) Helicone reactor with a capacity of 15 gallons was used. The Helicone reactor was equipped with twin opposing helical blades with a 270 degree twist. The blades were constructed of 316 SS (Stainless Steel) with a 16 g polish finish and the blade speed could be varied from 1 to 65 rpm (revolutions per minute). The agitators were connected to a constant torque inverter duty motor, which operated at 230/460 VAC, and 60 Hz. The bowl had a double intersecting cone-type design rated for 150 psig positive pressure or vacuum to 0.2 mm Hg at a temperature of 450° F. The vessel was equipped with baffled jacketing to permit uniform circulation of heating and cooling medium at a pressure of 100 psig. The interior of the mix chamber was constructed of 316 SS with 16 g polish finish throughout and built in accordance with ASME code. The agitators provide excellent surface area for the polymer melt to build molecular weight.

The Helicone reactor was also equipped with an overhead condenser to condense the (BDO/THF/H2O/MeOH) vapors in the esterification, trans-esterification (if any), and polymerization stages. A Federov valve was used to sample polymer melt and oligomers from the reaction medium during atmospheric pressure and under reduced reactor pressure.

Method

PBT oligomer (entries 1-5) was prepared in the Helicone reactor with a BDO to PTA mole ratio equal to 6:1. The reactor was charged with 6.8 kg (approximately 41.0 mole) of PTA, 21.7 kg (approximately 241 mole) of BDO, and 10.0 ml of TPT at 170° C. under a nitrogen atmosphere. The agitator speed was set at 67% of maximum. The temperature was raised to 240° C. over a period of 30 minutes. The ester interchange (EI) reaction was run at 240° C. until the clearing point was visually observed and sample was obtained. After the clearing point was reached, the pressure was reduced to 350 mm of Hg at 240° C. over a period of 11 minutes, and then held constant for 16 minutes. Two samples were obtained at this pressure using the federov valve. Then, the pressure was reduced to 200 mm of Hg at 240° C. over a period of 6 minutes, and held constant for 11 minutes. Two additional samples were obtained at this pressure. Finally, the reaction was stopped, the pressure was increased to atmospheric pressure over a minute, and the polymer sample was obtained for analysis (IV and CEG).

PBT oligomer (entries 6-14) were prepared in Helicone with a BDO to PTA mole ratio equal to 4.79:1. The reactor was charged with 6.8 kg (approximately 41.0 mole) of PTA, 17.69 kg (approximately 196 mole) of BDO, and 9.0 ml of TPT at 170° C. under a nitrogen atmosphere. The agitator speed was set at 67% of maximum. The temperature was raised to 240° C. over a period of 30 minutes. The ester interchange (EI) reaction was run at 240° C. until the clearing point was visually observed, and a sample was obtained. After the clearing point was reached, the pressure was reduced to 400 mm of Hg at 240° C. over a period of 27 minutes and then held constant for 20 minutes. Four samples at different intervals were obtained at this pressure using a federov valve. Then, the pressure was reduced to 200 mm of Hg at 240° C. over a period of 12 minutes, and held constant for 24 minutes at this pressure. Three additional samples were obtained at this pressure. Finally, the reaction was stopped, pressure increased to atmospheric pressure, and the polymer sample was obtained for analysis (IV and CEG).

PBT oligomer (entries 15-22) were prepared in Helicone Reactor with a BDO to PTA mole ratio equal to 4:1. The reactor was charged with 6.8 kg (approximately 41.0 mole) of PTA, 14.8 kg (approximately 164 mole) of BDO, and 9.0 ml of TPT at 170° C. under a nitrogen atmosphere. The agitator speed was set at 67% of maximum. The temperature was raised to 240° C. over a period of 30 minutes. The ester interchange (EI) reaction was run at 240° C. until the clearing point was visually observed, and a sample was obtained. After the clearing point was reached, the pressure was reduced to 200 mm of Hg at 240° C. over a period of 26 minutes, and then held constant for 56 minutes. Six samples at different intervals were obtained at this pressure using a federov valve. Finally, the reaction was stopped, pressure increased to atmospheric pressure, and the polymer sample was obtained for analysis (IV and CEG).

PBT oligomer (entries 23-28) were prepared in a Helicone Reactor with a BDO to PTA mole ratio equal to 3:1. The reactor was charged with 6.8 kg (approximately 41.0 mole) of PTA, 11.3 kg (approximately 125 mole) of BDO, and 9.0 ml of TPT at 170° C. under a nitrogen atmosphere. The agitator speed was set at 67% of maximum. The temperature was raised to 240° C. over a period of 30 minutes. The ester interchange (EI) reaction was run at 240° C. During the EI stage, condensed overhead from the reactor was measured, and an equal amount of fresh BDO was added every 30 minutes to compensate for the overhead condensate. A total of 7.0 kg of fresh BDO was added until clearing was reached, and a sample was obtained. After the clearing point was reached, the temperature is reduced to 230° C. and pressure was reduced to 200 mm of Hg over a period of 50 minutes. The conditions are then held constant for 36 minutes at this pressure. Four samples at different intervals were obtained at this pressure using a Federov valve. Finally, the reaction was stopped, pressure increased to atmospheric pressure, and the polymer sample was obtained for analysis (IV and CEG).

PBT oligomer (entries 29-35) were prepared in a Helicone Reactor with a BDO to PTA mole ratio equal to 3:1. The reactor was charged with 6.8 kg (approximately 41.0 mole) of PTA, 11.3 kg (approximately 125 mole) of BDO, and 6.0 ml of TPT at 170° C. under a nitrogen atmosphere. The agitator speed was set at 67% of maximum. The temperature was raised to 240° C. over a period of 30 minutes. The ester interchange (EI) reaction was run at 240° C. During the EI stage, the condensed overhead from the reactor was measured, and an equal amount of fresh BDO was added every 30 minutes to compensate for the overhead condensate. A total of 9.0 kg of fresh BDO was added until clearing was reached and then a sample was obtained. After the clearing point was reached, the temperature was increased to 260° C. at atmospheric pressure and held constant for 170 minutes. Five samples at different intervals were obtained at this temperature using a Federov valve. Finally, the reaction was stopped and the polymer sample was obtained for analysis (IV and CEG).

PBT oligomer (entries 36-38) were the repetition of previous trial and were prepared in Helicone reactor with a BDO to PTA mole ratio equal to 3:1. The reactor was charged with 6.8 kg (approximately 41.0 mole) of PTA, 11.3 kg (approximately 125 mole) of BDO, and 6.0 ml of TPT at 170° C. under a nitrogen atmosphere. The agitator speed was set at 67% of maximum. The temperature was raised to 240° C. over a period of 30 minutes. The ester interchange (EI) reaction was run at 240° C. During the EI stage, the condensed overhead from the reactor was measured, and an equal amount of fresh BDO was added every 30 minutes to compensate for the overhead condensate. A total of 6.5 kg of fresh BDO was added until clearing was reached, and a sample was obtained. After the clearing point was reached, the temperature was increased to 260° C. and held constant. One sample was obtained at this temperature at 90 minutes using a Federov valve. Finally, the reaction was stopped at 120 minutes and the polymer sample was obtained for analysis (IV and CEG).

PBT oligomer (entries 39-40) were prepared in the Helicone reactor with a BDO to PTA mole ratio equal to 3:1. The reactor was charged with 6.8 kg (approximately 41 mole) of PTA, 11.3 kg (approximately 125 mole) of BDO, and 6.0 ml of TPT at 170° C. under a nitrogen atmosphere. The agitator speed was set at 67% of maximum. The temperature was raised to 240° C. with a ramp rate of 2° C. per minute. The ester interchange (EI) reaction was run at 240° C. During the EI stage, the condensed overhead from the reactor was allowed to reflux back to the reactor. No fresh BDO was added during this step. After the clearing point was reached, a sample was obtained. Then the temperature is increased to 260° C. and held constant. Finally, the reaction was stopped at 90 minutes and the polymer sample was obtained for analysis (IV and CEG).

PBT oligomer (entries 41-43) were prepared in the Helicone reactor with a BDO to PTA mole ratio equal to 3:1, and were the repetition of previous trial. The reactor was charged with 6.8 kg (approximately 41.0 mole) of PTA, 11.3 kg (approximately 125 mole) of BDO, and 6.0 ml of TPT at 170° C. under a nitrogen atmosphere. The agitator speed was set at 67% of maximum. The temperature was raised to 240° C. with a ramp rate of 2° C. per minute. The ester interchange (EI) reaction was run at 240° C. During the EI stage, the condensed overhead from the reactor was allowed to reflux back to the reactor. No fresh BDO was added during this step. After the clearing point was reached, a sample was obtained. Then the temperature was increased to 260° C. and held constant. One sample was obtained at 90 minutes using the Federov valve. Finally, the reaction was stopped at 105 minutes, and the polymer sample was obtained for analysis (IV and CEG).

PBT oligomer (entries 44-54) were prepared in the Helicone reactor with a BDO to PTA mole ratio equal to 3.5:1. The reactor was charged with 6.8 kg (approximately 41.0 mole) of PTA, 13.62 kg (approximately 151 mole) of BDO, and 6.0 ml of TPT at 170° C. under a nitrogen atmosphere. The agitator speed was set at 67% of maximum. The temperature was raised to 240° C. with a ramp rate of 2° C. per minute. The ester interchange (EI) reaction was run at 240° C. until the clearing point was visually observed. During the EI stage, the condensed overhead from the reactor was allowed to reflux back into the reactor. After the clearing point was reached (as observed visually), the temperature was maintained at 240° C. for 20 minutes. Five samples were obtained at this condition. The temperature was then increased to 260° C. and held constant for 180 minutes. Five samples at different intervals (approximately 30 minutes) were obtained using a Federov valve. Finally, the reaction was stopped and the final polymer sample was obtained for analysis (IV and CEG).

PBT oligomer (entries 55-64) were prepared in the Helicone reactor with a BDO to PTA mole ratio equal to 4:1. The reactor was charged with 6.8 kg (approximately 41.0 mole) of PTA, 14.96 kg (approximately 166 mole) of BDO, and 6.0 ml of TPT at 170° C. under a nitrogen atmosphere. The agitator speed was set at 67% of maximum. The temperature was raised to 240° C. with a ramp rate of 2° C. per minute. The ester interchange (EI) reaction was run at 240° C. until the clearing point was visually observed. During the EI stage, the condensed overhead from the reactor was allowed to reflux back into the reactor. After the clearing point was reached (as observed visually), the temperature was maintained at 240° C. for 30 minutes. Four samples were obtained at this temperature. The temperature was then increased to 260° C. and held constant for 180 minutes. Five samples at different intervals were obtained at this temperature using a Federov valve. Finally, the reaction was stopped and the final polymer sample was obtained for analysis (IV and CEG).

General Testing of PBT Oligomers:

The IV of oligomers was measured using an automatic Viscotek Microlab® 500 series Relative Viscometer Y501. 0.5 grams of oligomer sample was fully dissolved in a 60 to 40 mixture (% volume) of phenol and 1,1,2,2-tetrachloroethane solution (Harrell Industries). Two measurements were taken for each sample, and the reported result was the average of the two measurements.

The CEG concentration of oligomers was measured using Metrohm-Autotitrator including Titrando 907, 800 Dosino, 2 ml and 5 ml dosing units and 814 USB sample processor. All the units are controlled from a PC using Tiamo 2.0 Full version. 1.5-2.0 grams of oligomer was fully dissolved in 50 ml of O-cresol solvent at 80° C. After dissolving, the sample was cooled to room temperature and 50 ml of O-cresol and 1 ml of water were added to the beaker. Sample blank was prepared in the similar way. The electrodes and titrant dosino were dipped into the sample solution and the titration was started. The sample titration was repeated twice and the equivalence point was noted for the calculation of CEG value.

Discussion

The primary objective of the study was to determine process conditions required to produce PTA-based PBT oligomers with an IV between 0.13 and 0.17 dl/g, and a CEG concentration between 100 and 180 mmol/kg in a pilot scale batch reactor.

There are two main steps in the preparation of desired PBT oligomers in the Helicone batch reactor. The first step is the direct esterification process which is completed at the "clearing point" and indicates the point where a homogeneous melt is formed. The second step is the trans-esterification process where the IV increases with residence time in the reactor. In all runs, the esterification process conditions were kept constant. After the clearing point is visually observed, the trans-esterification process was initiated by i) increasing the reactor temperature, or ii) decreasing reactor pressure, or iii) by simultaneous combinations of i and ii. A sampling valve was used to sample during the reaction. The process variables of trans-esterification step were optimized to achieve the PTA based PBT oligomers IV and CEG specs. Variables for the process optimizations were: BDO to PTA mole ratio, trans-esterification reaction temperature, trans-esterification pressure after clearing point, effect of overhead reflux, effect of addition of fresh BDO during esterification step, and residence time after clearing point.

Effect of BDO to PTA Mole Ratio and Trans-Esterification Stage Reduced Pressure

For each trial, the overhead composition during the direct esterification step involved the production of BDO, THF, and H2O. It was observed that BDO to PTA mole ratio in charge feed has a direct impact on the clearing time. As BDO to PTA mole ratio increases, the time required to reach clearing point decreases considerably. The effects of PTA to BDO ratio and pressure on IV and CEG of oligomers are summarized in Tables 1.1-1.4.

Table 1.1 represents PBT oligomers prepared with 6:1 BDO to PTA mole ratio. The Ester-Interchange temperature was 240° C. During the trans-esterification stage, reaction pressure was reduced to between 350 and 200 mm of Hg at 240° C. It is observed that IV of PBT oligomers increases with application of reduced pressure. However, an opposite trend in CEG values is observed. As the pressure is reduced, the CEG concentration of the PBT oligomers decreases from 134 mmol/kg at clearing point to approximately 5 mmol/kg in 45 minutes.

Table 1.2 summarizes the PBT oligomers prepared with 6:1 BDO to PTA mole ratio. The Ester-Interchange temperature was 240° C. During the trans-esterification stage, reactor pressure was held constant at 400 mm of Hg for 20 minutes, followed by 200 mm of Hg for another 24 minutes. At this ratio, a similar trend for IV and CEG is observed. The IV of PBT oligomers increases with residence time. Reduced reaction pressure in the trans-esterification stage increases the consumption of CEG. A final CEG value of 10 mmol/kg was achieved for the final PBT oligomer.

Table 1.3 represents PBT oligomers prepared with 4:1 BDO to PTA mole ratio under reduced pressure equal to 200 mm of Hg. During the trans-esterification stage, the reactor temperature was held constant at 240° C. and a constant pressure of 200 mm of Hg was applied for 56 minutes. It can be seen that the IV of PBT oligomers increases with the residence time. However, the CEG concentration is maximum at the clearing point, and decreases rapidly to a minimum value of 9 mmol/kg on application of reduced pressure.

A similar trend is also observed in Table 1.4, which shows PBT oligomers prepared with 3:1 BDO to PTA mole ratio. The application of reduced pressure of 200 mm of Hg during the trans-esterification step increases IV, but decreases CEG concentration values very rapidly.

Tables 1-4 clearly indicate that IV build up is a strong function of residence time, and proportionally increases with increased residence time. Further, the reaction pressure also impacts the CEG consumption rate to a very large extent. As the process reaction pressure reduces, the reaction rate in trans-esterification step increases rapidly along with the CEG consumption rate. Based on this, it can be concluded that reduction of reactor pressure during the trans-esterification step reduces CEG to less than 50 mmol/kg. This is outside the CEG specification of 100 and 180 mmol/kg.

TABLE 1.1

PBT Oligomers prepared with 6:1 BDO to PTA mole ratio.

| Entry # | Reactor Temp (° C.) | Pressure (mm of Hg) | Time (min) | IV (dl/g) | CEG (mmol/kg) |
|---|---|---|---|---|---|
| 1 | 240 | 760 | 0 (Clear Point) | 0.11 | 134 |
| 2 | 240 | 351 | 11 | 0.09 | 15 |
| 3 | 240 | 364 | 27 | 0.11 | 15 |
| 4 | 240 | 192 | 33 | 0.13 | 9 |
| 5 | 240 | 210 | 44 | 0.16 | 5 |

Ester-Interchange Step: Temperature = 240° C., Pressure = 760 mm of Hg
Trans-Esterification Step 1: Temperature = 240° C., Pressure = 350 mm of Hg, RT = 16 minutes
Trans-Esterification Step 2: Temperature = 240° C., Pressure = 200 mm of Hg, RT = 11 minutes
Time between 0 and 11 minutes corresponds to transition between 760 mm of Hg and 351 mm of Hg
Time between 27 and 33 minutes corresponds to transition between 364 mm of Hg and 192 mm of Hg

TABLE 1.2

PBT Oligomers prepared with 4.79:1 BDO to PTA mole ratio.

| Entry # | Reactor Temp (° C.) | Pressure (mm of Hg) | Time (min) | IV (dl/g) | CEG (mmol/kg) |
|---|---|---|---|---|---|
| 6 | 240 | 760 | 0 (Clear Point) | 0.08 | 326 |
| 7 | 240 | 410 | 27 | 0.06 | 62 |
| 8 | 240 | 397 | 36 | 0.06 | 38 |
| 9 | 240 | 401 | 41 | 0.07 | 32 |
| 10 | 240 | 402 | 47 | 0.08 | 28 |
| 11 | 240 | 217 | 59 | 0.10 | 19 |
| 12 | 240 | 194 | 64 | 0.10 | 18 |
| 13 | 240 | 196 | 71 | 0.10 | 16 |
| 14 | 240 | 760 | 83 | 0.11 | 10 |

Ester-Interchange Step: Temperature = 240° C., Pressure = 760 mm of Hg
Trans-Esterification Step 1: Temperature = 240° C., Pressure = 400 mm of Hg, RT = 20 minutes
Trans-Esterification Step 2: Temperature = 240° C., Pressure = 200 mm of Hg, RT = 24 minutes
Time between 0 and 27 minutes corresponds to transition between 760 mm of Hg and 410 mm of Hg
Time between 47 and 59 minutes corresponds to transition between 402 mm of Hg and 217 mm of Hg

TABLE 1.3

PBT Oligomers prepared with 4:1 BDO to PTA mole ratio.

| Entry # | Reactor Temp (° C.) | Pressure (mm of Hg) | Time (min) | IV (dl/g) | CEG (mmol/kg) |
|---|---|---|---|---|---|
| 15 | 240 | 760 | 0 (Clear Point) | 0.13 | 270 |
| 16 | 240 | 198 | 26 | 0.11 | 24 |
| 17 | 240 | 205 | 42 | 0.11 | 13 |
| 18 | 240 | 211 | 58 | 0.13 | 15 |
| 19 | 240 | 201 | 64 | 0.13 | 15 |
| 20 | 240 | 198 | 70 | 0.13 | 16 |
| 21 | 240 | 203 | 75 | 0.15 | 14 |
| 22 | 240 | 760 | 82 | 0.15 | 9 |

Ester-Interchange Step: Temperature = 240° C., Pressure = 760 mm of Hg
Trans-Esterification Step: Temperature = 240° C., Pressure = 200 mm of Hg, RT = 56 minutes
Time between 0 and 26 minutes corresponds to transition between 760 mm of Hg and 198 mm of Hg
$82^{nd}$ minute corresponds to transition between 203 mm of Hg and 760 mm of Hg

TABLE 1.4

PBT Oligomers prepared with 3:1 BDO to PTA mole ratio. Additional BDO is added to compensate for overhead condensate lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 23 | 240 | 760 | 0 (Clear Point) | 0.10 | 52 |
| 24 | 230 | 213 | 50 | 0.15 | 5 |
| 25 | 230 | 202 | 67 | 0.15 | 13 |
| 26 | 230 | 186 | 73 | 0.15 | 15 |
| 27 | 230 | 176 | 78 | 0.15 | 16 |
| 28 | 230 | 750 | 87 | 0.15 | 16 |

Ester-Interchange Step: Temperature = 240° C., Pressure = 760 mm of Hg
Trans-Esterification Step: Temperature = 230° C., Pressure = 200 mm of Hg, RT = 36 minutes
Time between 0 and 50 minutes corresponds to transition from 760 mm of Hg to 213 mm of Hg followed by temperature decrease from 240° C. to 230° C.
$87^{th}$ minute corresponds to transition between 176 mm of Hg and 760 mm of Hg Effect of PTA Kinetics on IV and CEG There is a need to control the CEG consumption rate of PBT oligomers during the IV increase process with the residence time. The kinetics of PTA based PBT polymer process follows a parabolic interaction between IV and CEG as showed in FIG. 1. At first, the CEG value starts from a maximum, and decreases with the increase of IV to reach a global minima. Then, the CEG value starts increasing with IV as a result of side reactions such as chain backbiting. There are two possible options to control the CEG of the PBT oligomers. The first option is to remain on the left hand side of the curve in FIG. 1. This is possible by means of trans-esterification reaction in heterogeneous medium leading to target IV build-up while decreasing the CEG consumption rate. This option requires a complex reflux system on a batch setup mode, allowing CEG consumption rate to be regulated with a reflux rate. This option will be investigated in the subsequent reports. The second option is to build IV with no application of reduced pressure, which leads to decreased IV build-up rate. This option forces an increase in the residence time of the process, after the clearing point to reach the desired IV specification.

Currently, the PBT process stands at the right hand side of the kinetic curve (FIG. 1). By forcing the residence time to increase, the CEG value will also increase consequently due to the backbiting reaction; resulting in achieving desired specifications for both the IV and CEG.

Effect of Addition of Fresh BDO During Esterification Reaction and Atmospheric Pressure in the Trans-Esterification Reaction Table 1.5 shows results for PBT oligomers (entries 29-35) prepared in this study by the process which was explained as the second option in FIG. 1.

TABLE 1.5

PBT Oligomers prepared with 3:1 BDO to PTA mole ratio.
Additional BDO is added to compensate for overhead condensate lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 29 | 240 | 760 | 0 (Clear Point) | 0.07 | 52 |
| 30 | 260 | 760 | 34 | 0.10 | 46 |
| 31 | 260 | 760 | 66 | 0.13 | 62 |
| 32 | 260 | 760 | 96 | 0.15 | 83 |
| 33 | 260 | 760 | 125 | 0.16 | 106 |
| 34 | 260 | 760 | 155 | 0.18 | 137 |
| 35 | 260 | 760 | 170 | 0.19 | 151 |

Ester-Interchange Step: Temperature = 240° C., Pressure = 760 mm of Hg
Trans-Esterification Step: Temperature = 240° C., Pressure = 760 mm of Hg, RT = 170 minutes
Time between 0 and 34 minutes corresponds to transition 240° C. to 260° C.

Figure 2:
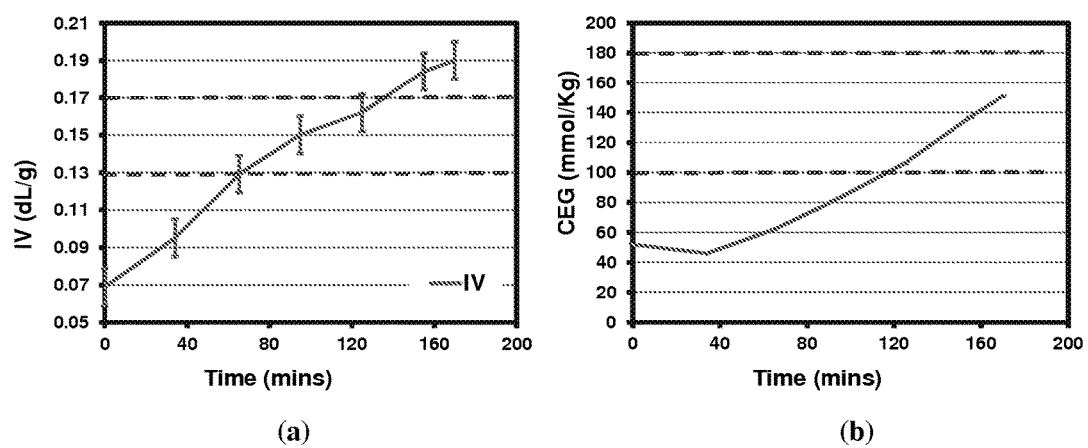
FIG. 2 depicts (a) IV and (b) CEG values for PBT oligomer prepared with 3:1 BDO to PTA mole ratio.

In this experiment and the next, the reactor pressure was not reduced beyond the clearing point in order to optimize conditions to reach both the IV and CEG concentration specification. FIG. 2 shows IV and CEG changes for entries 29-35. In FIG. 2, additional BDO was added to compensate for overhead condensate during esterification reaction at 240° C. The temperature was increased to 260° C. in the trans-esterification step. Dashed blue lines represent IV and CEG specifications.

It can be seen that the IV of PBT oligomers increases gradually with residence time, however the IV build rate is slower compared to previous examples where reduced pressure was applied in the trans-esterification step. Further, the CEG concentration of PBT oligomers is closer to the local minima, and begins to increase gradually on application of increased temperature at atmospheric pressure with residence time. Approximately 2 hours into the trans-esterification step, an IV of 0.16 dl/g and CEG of 106 mmol/kg were achieved.

Table 1.6 (entries 36-38) shows the data from repetition process for entries 29-35. An IV of 0.16 dl/min and a CEG of 115 mmol/kg was obtained 90 minutes after clearing point (or in the trans-esterification step).

TABLE 1.6

Repetition of PBT Oligomers prepared with 3:1 BDO to PTA mole ratio. Additional BDO is added to compensate for overhead condensate lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 36 | 260 | 760 | 0 (Clear Point) | 0.05 | 248 |
| 37 | 261 | 760 | 90 | 0.16 | 115 |
| 38 | 262 | 760 | 120 | 0.18 | 135 |

Ester-Interchange Step: Temperature = 240° C., Pressure = 760 mm of Hg
Trans-Esterification Step: Temperature = 240° C., Pressure = 760 mm of Hg, RT = 120 minutes Effect of Reflux on the Esterification Reaction The drawback of previous examples (entries 29-35 and entries 36-38) is the addition of fresh BDO to compensate the loss of overheads during the Esterification stage. This may not be feasible for scale-up to a bigger reactor. Therefore, a reflux mode was applied in the next example (entries 39-40) by allowing the condensed overhead to reflux back to the reactor. After the completion of the esterification step (visual observation), the reaction temperature was increased to 260° C.

Table 1.7 shows the IV and CEG changes overtime for entries 39-45 performed at BDO to PTA mole ratio equal to 3:1. It can be seen that the IV and CEG follow the same trend as before and approximately 90 minutes after clearing point is visually observed, and IV of 0.16 dl/g and a CEG of 95 mmol/kg were achieved.

TABLE 1.7

PBT Oligomers prepared with 3:1 BDO to PTA mole ratio under reflux. No additional BDO added to compensate for overheads lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 39 | 240 | 760 | 0 (Clear Point) | 0.05 | 330 |
| 40 | 260 | 760 | 90 | 0.16 | 95 |

Ester-Interchange Step: Temperature = 240° C., Pressure = 760 mm of Hg
Trans-Esterification Step: Temperature = 260° C., Pressure = 760 mm of Hg, RT = 90 minutes

TABLE 1.8

PBT Oligomers prepared with 3:1 BDO to PTA mole ratio under reflux. No additional BDO added to compensate for overheads lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 41 | 240 | 760 | 0 (Clear Point) | 0.05 | 397 |
| 42 | 260 | 760 | 90 | 0.16 | 98 |
| 43 | 260 | 760 | 105 | 0.18 | 109 |

Ester-Interchange Step: Temperature = 240° C., Pressure = 760 mm of Hg
Trans-Esterification Step: Temperature = 260° C., Pressure = 760 mm of Hg, RT = 105 minutes Effect of i.) BDO to PTA Mole Ratio and ii.) Reflux on Esterification Reaction.

It can be seen from the last four experiments that process conditions can be modified to produce the PTA based PBT oligomers to cover the entire range of IV. The limitation is the inability to hit the lower range of the CEG specification. For a successful scale-up, it is desired to establish process capability to produce the PTA based PBT oligomers that can cover the complete specification range for both the IV and CEG (i.e. low, medium and high). In order to achieve the higher CEG (between 150 and 180 mmol/kg), the IV build-up rate in the Helicone reactor should be decreased even more during the same residence time. It was postulated that the BDO to PTA mole ratio may directly impact the IV build-up rate of the oligomers. This was investigated by slowing the IV build-rate at the trans-esterification temperature of 260° C. and atmospheric pressure. For this purpose, new experiments (entries 44-54 and entries 55-64) were performed to evaluate the effect of BDO to PTA mole ratio equal to 3.5:1 and 4:1 respectively, on the IV and CEG. The esterification step was carried under total reflux at 240° C. In the trans-esterification step, reactor temperature was increased to 260° C.

Figure 3:
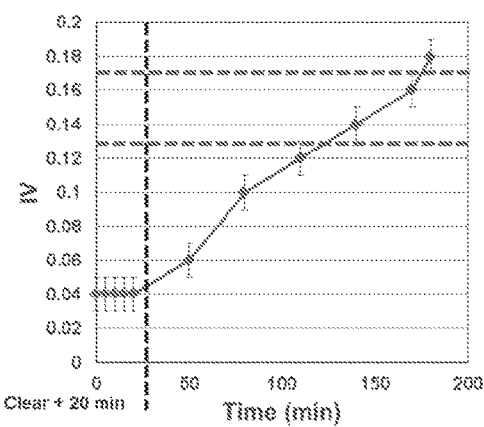
FIG. 3 shows (a) IV and (b) CEG trends for PTA based PBT oligomer made with 3.5:1 BDO to PTA mole ratio.
Figure 3:
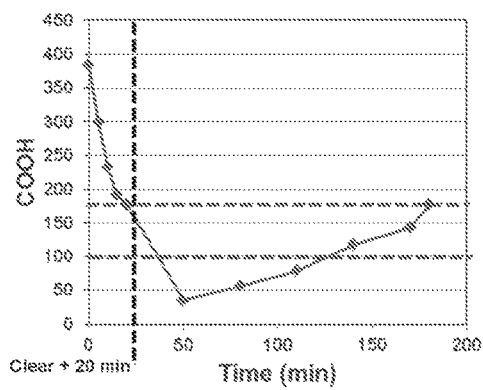

FIG. 3 shows IV and CEG trends for PTA based PBT oligomers made with 3.5:1 BDO to PTA mole ratio. In the figure, the IV and CEG for PBT oligomers prepared with 3.5:1 BDO to PTA mole ratio under reflux. Dashed red lines are the desired specifications for the IV and CEG. Dashed black line corresponds to clearing point plus 20 minutes, and represents the point when reactor temperature was increased to 260° C. The effect of visual observation (or time of observation) of clearing point was investigated by allowing the reaction to proceed for additional 20 minutes at the reactor temperature of 240° C. in the esterification step. The rationale for introducing additional time after clearing point was to simplify the process translation from the Helicone reactor used in this example to a bigger scale reactor.

FIG. 3 shows that the IV of the PBT oligomers does not change appreciably during 20 minutes (after visual observation of the clearing point). However, the CEG of PBT oligomers follows an inverse trend and decreases sharply to reach a local minima. After 20 minutes and at temperature equal to 260° C., a further reduction in the CEG value is observed that eventually reaches a global minima point at around 30 minutes. The CEG then starts to increase gradually at 260° C. The IV curve indicates a gradual increase with residence time, but the rate of the reaction is slower compared to the previous examples. As a result, the residence time to obtain an IV of 0.16 dl/g is longer, thus allows enhanced backbiting reaction to increase CEG value of the PBT oligomers. The results for this reaction (entries 44-54) are provided in Table 9, and shows an IV of 0.16 dl/g and CEG of 143 mmol/kg at a residence time equal to 174 minutes. This corresponds to the middle specifications for the IV and CEG.

TABLE 1.9

PBT Oligomers prepared with 3.5:1 BDO to PTA mole ratio under reflux. No additional BDO added to compensate for overheads lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 49 | 240 | 760 | 0 (Clear Point) | 0.04 | 384 |
| 50 | 240 | 760 | 6 | 0.04 | 299 |
| 51 | 240 | 760 | 12 | 0.04 | 233 |
| 52 | 240 | 760 | 17 | 0.04 | 193 |
| 53 | 240 | 760 | 22 | 0.04 | 177 |
| 54 | 260 | 760 | 53 | 0.06 | 35 |
| 55 | 260 | 760 | 84 | 0.10 | 56 |
| 56 | 260 | 760 | 113 | 0.12 | 79 |
| 57 | 260 | 760 | 143 | 0.14 | 117 |
| 58 | 260 | 760 | 174 | 0.16 | 143 |
| 59 | 260 | 760 | 203 | 0.18 | 177 |

Figure 4:
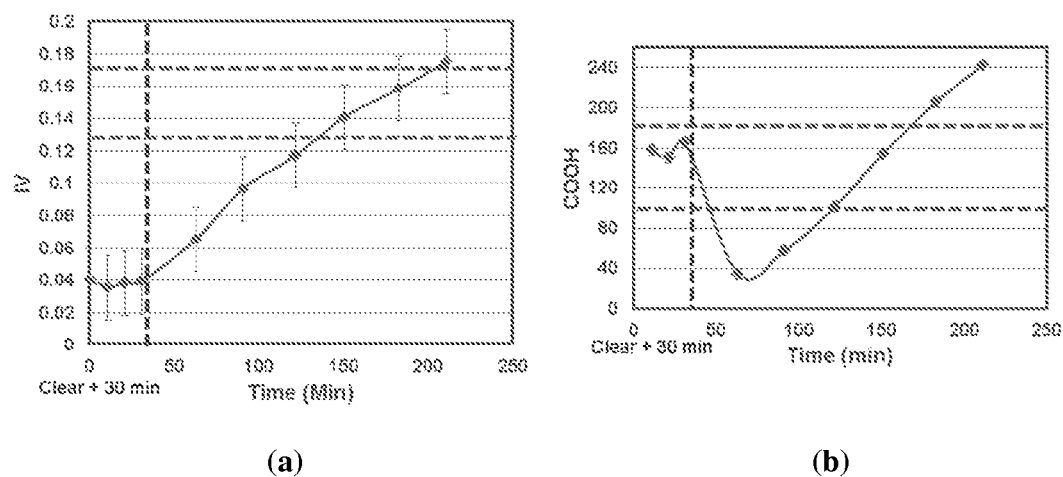
FIG. 4 shows (a) IV and (b) CEG trends for PTA based PBT oligomer made with 3.5:1 BDO to PTA mole ratio.

Ester-Interchange Step: Temperature = 240° C., Pressure = 760 mm of Hg
Ester-Interchange Step after Clearing Point: Temperature = 240° C., Pressure = 760 mm of Hg, RT = 20 minutes
Trans-Esterification Step: Temperature = 260° C., Pressure = 760 mm of Hg, RT = 180 minutes In order to achieve the upper range of the specification limit of CEG (~180 mmol/kg) in the PBT oligomers, the BDO to PTA mole ratio was increased further to 4:1. The increased BDO in the reactor will force an increase in residence time to hit the required IV, as well as proportionally increase the extent of backbiting reaction to achieve the higher CEG. In this experiment (entries 55-64), additional 30 minutes were allowed at 240° C. (after clearing point) before the reactor temperature was increased to 260° C. FIG. 4 shows the IV and CEG trends for PTA based PBT oligomers made with 4:1 BDP to PTA mole ratio. In the figure, dashed red lines are the desired specifications for the IV and CEG. Dashed black line corresponds to clearing point plus 30 minutes, and represents the point when reactor temperature was increased to 260° C.

It can be clearly seen from FIG. 4 that the IV build-up rate is even slower and the CEG is higher compared to the previous example (entries 44-54), and validates the hypothesis that BDO to PTA mole ratio can affect both IV and CEG. It is also noted that from the FIG. 4 that additional 30 minutes after clearing point is not enough to achieve the minimum CEG value. The CEG value again decreases sharply in trans-esterification stage in the beginning followed by a gradually increase with the residence time. The results for this reaction (entries 55-64) are provided in Table 1.10, and show an IV of 0.16 dl/g and CEG of 205 mmol/kg at a residence time equal to 183 minutes. This corresponds to the upper range of the specifications for IV and CEG.

TABLE 1.10

PBT Oligomers prepared with 4:1 BDO to PTA mole ratio under reflux. No additional BDO added to compensate for overheads lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 60 | 240 | 760 | 0 (Clear Point) | 0.05 | 322 |
| 61 | 240 | 760 | 11 | 0.04 | 158 |
| 62 | 240 | 760 | 21 | 0.04 | 151 |
| 63 | 240 | 760 | 31 | 0.04 | 166 |

TABLE 1.10-continued

PBT Oligomers prepared with 4:1 BDO to PTA mole ratio under reflux. No additional BDO added to compensate for overheads lost during the Ester-Interchange reaction.

| Entry # | Reactor Temp (° C.) | Pressure (mm of Hg) | Time (min) | IV (dl/g) | CEG (mmol/kg) |
|---|---|---|---|---|---|
| 64 | 260 | 760 | 63 | 0.06 | 34 |
| 65 | 260 | 760 | 92 | 0.10 | 57 |
| 66 | 260 | 760 | 123 | 0.12 | 102 |
| 67 | 260 | 760 | 152 | 0.14 | 155 |
| 68 | 260 | 760 | 183 | 0.16 | 205 |
| 69 | 260 | 760 | 211 | 0.18 | 242 |

Ester-Interchange Step: Temperature = 240° C., Pressure = 760 mm of Hg
Ester-Interchange Step after Clearing Point: Temperature = 240° C., Pressure = 760 mm of Hg, RT = 30 minutes
Trans-Esterification Step: Temperature = 260° C., Pressure = 760 mm of Hg, RT = 180 minutes In conclusion:
The IV and CEG depend on BDO to PTA mole ratio, esterification and trans-esterification temperature, trans-esterification pressure, residence time, and reflux during esterification stage.
The IV of the PBT oligomers is a function of residence time, and increases with longer residence time.
The CEG concentration is a strong function of reaction pressure in trans-esterification step.
The application of reduced pressure increases the kinetics of trans-esterification step there by increasing the CEG consumption rate. Increased temperature during the trans-esterification stage at atmospheric pressure provides conditions suitable to achieve the IV and CEG specifications.
The entire range for the IV and CEG specifications can be obtained by increasing the BDO to PTA mole ratio under reflux mode and trans-esterification reaction at increased temperature and atmospheric pressure.

Example 2: IV and CEG Optimization in PBT Oligomer Preparation

The materials and equipment were the same as in Example 1.

The PBT oligomer in Example 2.1 (entries 1-10) was prepared in Helicone with a BDO to PTA mole ratio equal to 4:1. The reactor was charged with 6.8 kg (approximately 41.0 mole) of PTA, 14.8 kg (approximately 164 mole) of BDO, and 9.0 ml of TPT at 170° C. under a nitrogen atmosphere. The agitator speed was set at 67% of maximum. The temperature was raised to 240° C. with a ramp rate of 2° C. per minute. Ester interchange (EI) reaction was run at 240° C. until the clearing point was visually observed. During EI stage, the condensed overhead from the reactor was allowed to reflux back into the reactor. After clearing point was reached (as observed visually), the pressure was reduced to 100 mm of Hg at 240° C. over a period of 30 minutes, and then held constant for 105 minutes. Ten samples at different intervals were obtained at this pressure using a Federov valve. Finally, the reaction was stopped, pressure increased to atmospheric pressure, and the polymer sample was obtained for analysis (IV and CEG).

The PBT oligomer in Example 2.2 (entries 11-21) was prepared in Helicone with a BDO to PTA mole ratio equal to 4:1. The reactor was charged with 6.8 kg (approximately 41.0 mole) of PTA, 14.8 kg (approximately 164 mole) of BDO, and 9.0 ml of TPT at 170° C. under a nitrogen atmosphere. The agitator speed was set at 67% of maximum. The temperature was raised to 240° C. with a ramp rate of 2° C. per minute. Ester interchange (EI) reaction was run at 240° C. until the clearing point was visually observed. During EI stage, the condensed overhead from the reactor was allowed to reflux back into the reactor. After clearing point was reached (as observed visually), the pressure was reduced to 50 mm of Hg at 250° C. over a period of 45 minutes, and then held constant for 105 minutes. Eleven samples at different intervals were obtained at this pressure using a Federov valve. Finally, the reaction was stopped, pressure increased to atmospheric pressure, and the polymer sample was obtained for analysis (IV and CEG).

The PBT oligomer in Example 2.3 (entries 22-26) was prepared in Helicone with a BDO to PTA mole ratio equal to 4:1. The reactor was charged with 6.8 kg (approximately 41.0 mole) of PTA, 14.8 kg (approximately 164 mole) of BDO, and 9.0 ml of TPT at 170° C. under a nitrogen atmosphere. The agitator speed was set at 67% of maximum. The temperature was raised to 240° C. with a ramp rate of 2° C. per minute. Ester interchange (EI) reaction was run at 240° C. until the clearing point was visually observed. During EI stage, the condensed overhead from the reactor was allowed to reflux back into the reactor. After clearing point was reached (as observed visually), the pressure was reduced to 1.8 mm of Hg at 240° C. over a period of 45 minutes, and then held constant for 18 minutes. Five samples at different intervals were obtained at this pressure using a Federov valve. Finally, the reaction was stopped, pressure increased to atmospheric pressure, and the polymer sample was obtained for analysis (IV and CEG).

The PBT oligomer in Example 2.4 (entries 27-32) were prepared in Helicone with a BDO to PTA mole ratio equal to 4:1. The reactor was charged with 6.8 kg (approximately 41.0 mole) of PTA, 14.8 kg (approximately 164 mole) of BDO, and 9.0 ml of TPT at 170° C. under a nitrogen atmosphere. The agitator speed was set at 67% of maximum. The temperature was raised to 240° C. with a ramp rate of 2° C. per minute. Ester interchange (EI) reaction was run at 240° C. until the clearing point was visually observed. During EI stage, the condensed overhead from the reactor was allowed to reflux back into the reactor. After clearing point was reached (as observed visually), the pressure was reduced to 1.8 mm of Hg at 250° C. over a period of 60 minutes, and then held constant for 9 minutes. Six samples at different intervals were obtained at this pressure using a Federov valve. Finally, the reaction was stopped, pressure increased to atmospheric pressure, and the polymer sample was obtained for analysis (IV and CEG).

The PBT oligomer in Example 1.5 (entry 33-37) were prepared in Helicone with a BDO to PTA mole ratio equal to 4:1. The reactor was charged with 6.8 kg (approximately 41.0 mole) of PTA, 14.8 kg (approximately 164 mole) of BDO, and 9.0 ml of TPT at 170° C. under a nitrogen atmosphere. The agitator speed was set at 67% of maximum. The temperature was raised to 240° C. with a ramp rate of 2° C. per minute. Ester interchange (EI) reaction was run at 240° C. until the clearing point was visually observed. During EI stage, the condensed overhead from the reactor was allowed to reflux back into the reactor. After clearing point was reached (as observed visually), the pressure was reduced to 4.8 mm of Hg at 250° C. over a period of 35 minutes, and then held constant for 25 minutes. Five samples at different intervals were obtained at this pressure using a Federov valve. Finally, the reaction was stopped, pressure increased to atmospheric pressure, and the polymer sample was obtained for analysis (IV and CEG).

General Testing of PBT Oligomers:

The IV and CEG of PBT oligomer was measured as provided in Example 1.

Results

The primary objective of the study was to determine process conditions required to produce PTA based PBT oligomers with an IV between 0.25 and 0.35 dl/g, and a CEG concentration below 10 mmol/kg in a pilot scale batch reactor. Variables for the process optimizations were: trans-esterification reaction temperature, trans-esterification pressure after clearing point, and residence time after clearing point.

For each trial, the overhead composition during the direct esterification step involves the production of BDO, THF, and $H_2O$. The esterification process conditions were kept constant for each example. PBT oligomers prepared with 4:1 BDO to PTA mole ratio. The Ester-Interchange temperature was 240° C.

Example 2.1

Figure 5:
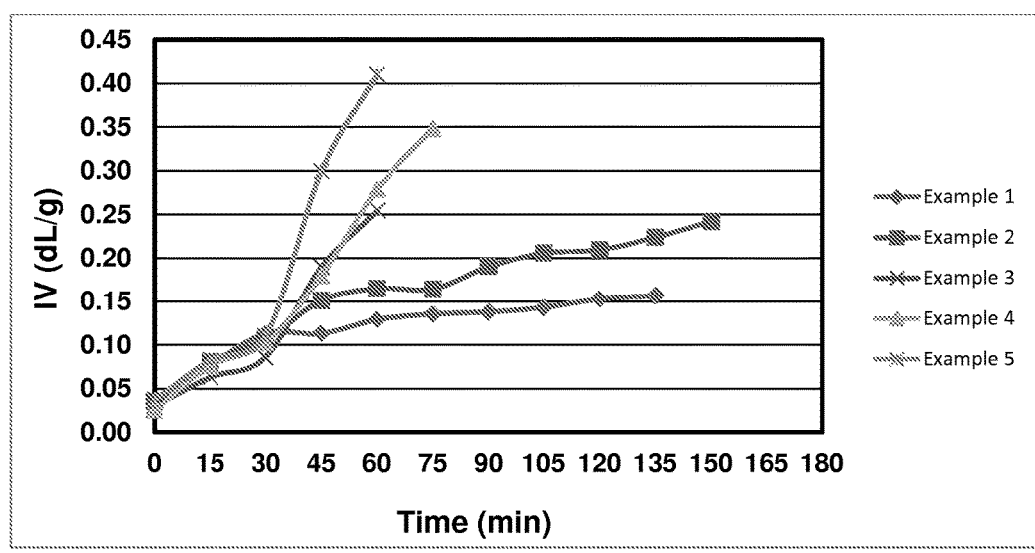
FIG. 5 depicts IV versus residence time curves after clearing point for PBT oligomer.
Figure 6:
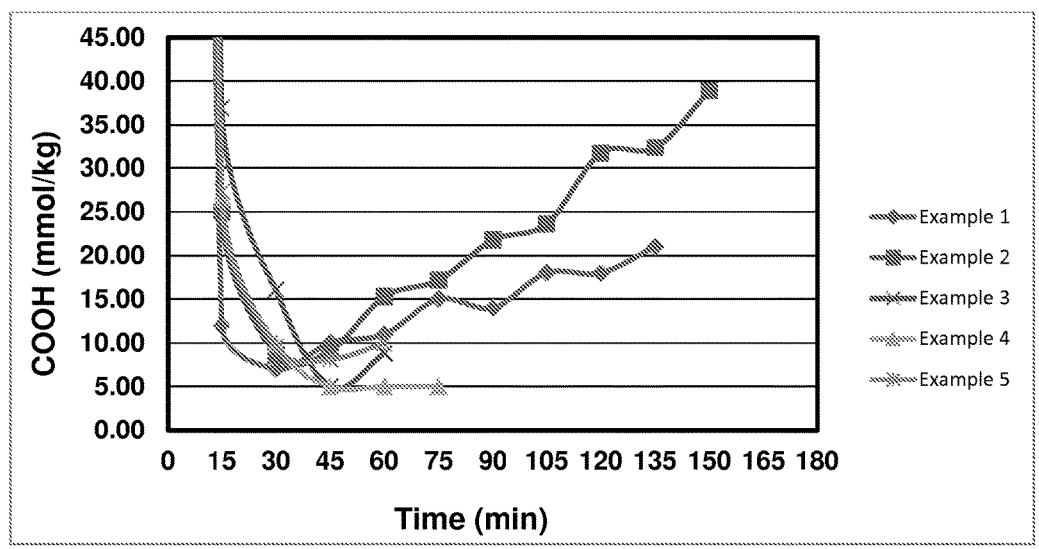
FIG. 6 depicts CEG versus residence time curves after clearing point for PBT oligomer.

Table 2.1 summarizes the PBT oligomers prepared through the trans-esterification stage, where the reactor pressure was reduced to 100 mm Hg for 30 minutes and held constant at 100 mm of Hg for 105 minutes. The melt temperature was kept at 240° C. during entire the transesterification step. The IV of PBT oligomers increases slowly with residence time due to the high reactor pressure (FIG. 5). Reduced reaction pressure in the trans-esterification stage increases the consumption rate of CEG which reaches to a minimum value of 7 mmol/kg (FIG. 6). Then, CEG value starts increasing due to the backbiting reaction. A final CEG value of 21 mmol/kg and IV of 0.16 dl/g were achieved for the final PBT oligomer. This example shows that the reactor pressure is not enough to increase the IV build-up rate and CEG consumption rate at the same time. The final IV of the resulting oligomer is lower than specs and final CEG value is higher than the specs.

TABLE 2.1

PBT Oligomers prepared at 100 mm Hg and 240° C.

| Entry # | Reactor Temp (° C.) | Pressure (mm of Hg) | Time (min) | IV (dl/g) | CEG (mmol/kg) |
|---|---|---|---|---|---|
| 1 | 240 | 760 | 0 (Clear Point) | 0.03 | 407 |
| 2 | 240 | 202 | 15 | 0.08 | 12 |
| 3 | 240 | 99 | 30 | 0.11 | 7 |
| 4 | 240 | 100 | 45 | 0.11 | 10 |
| 5 | 240 | 98 | 60 | 0.13 | 11 |
| 6 | 240 | 111 | 75 | 0.14 | 15 |
| 7 | 240 | 99 | 90 | 0.14 | 14 |
| 8 | 240 | 99 | 105 | 0.14 | 18 |
| 9 | 240 | 103 | 120 | 0.15 | 18 |
| 10 | 240 | 101 | 135 | 0.16 | 21 |

Ester-Interchange Step: Temperature = 240° C., Pressure = 760 mm of Hg
Trans-Esterification: Temperature = 240° C., Pressure = 100 mm of Hg, RT = 105 minutes Example 2.2

Table 2.2 summarizes the PBT oligomers prepared through the trans-esterification stage, where the reactor pressure was reduced to 50 mm Hg for 45 minutes and held constant at 50 mm of Hg for 105 minutes. The melt temperature was increased to 250° C. after clearing point and kept constant at that temperature during the entire transesterification step. Even though the IV build-up rate is higher compare to previous example, the rate is still slow to achieve low CEG value at higher IV. Accordingly, the reactor pressure should be lowered to increase the rate even further (FIG. 1). Reduced reaction pressure to 50 mm Hg in the trans-esterification stage does not change the consumption rate of CEG which reaches to a minimum value of 9 mmol/kg compare to previous example (FIG. 2). However, the rise in the transesterification temperature from 240° C. to 250° C. results in the increase of CEG values due to the rate increase of backbiting reaction. A final CEG value of 31 mmol/kg and IV of 0.24 dl/g are achieved for the final PBT oligomer. This example shows that the reactor pressure is not enough to increase the IV build-up rate and CEG consumption rate at the same time. The increase of the transesterification temperature leads to higher CEG build-up rate due to higher extent of backbiting reaction. The final IV of the resulting oligomer is lower than specs and final CEG value is higher than the specs.

TABLE 2

PBT Oligomers prepared at 50 mm Hg and 250° C.

| Entry # | Reactor Temp (° C.) | Pressure (mm of Hg) | Time (min) | IV (dl/g) | CEG (mmol/kg) |
|---|---|---|---|---|---|
| 11 | 250 | 760 | 0 (Clear Point) | 0.04 | 466 |
| 12 | 250 | 319 | 15 | 0.08 | 25 |
| 13 | 250 | 93 | 30 | 0.11 | 9 |
| 14 | 250 | 51 | 45 | 0.15 | 9 |
| 15 | 250 | 51 | 60 | 0.17 | 15 |
| 16 | 250 | 52 | 75 | 0.17 | 17 |
| 17 | 250 | 52 | 90 | 0.19 | 22 |
| 18 | 250 | 51 | 105 | 0.21 | 24 |
| 19 | 250 | 52 | 120 | 0.21 | 32 |
| 20 | 250 | 50 | 135 | 0.22 | 32 |
| 21 | 250 | 50 | 150 | 0.24 | 39 |

Ester-Interchange Step: Temperature = 240° C., Pressure = 760 mm of Hg
Trans-Esterification: Temperature = 250° C., Pressure = 50 mm of Hg, RT = 105 minutes Example 2.3

Table 2.3 summarizes the PBT oligomers prepared through the trans-esterification stage, where the reactor pressure was reduced to 1.8 mm Hg for 45 minutes and held constant at 1.8 mm of Hg for 18 minutes. The melt temperature was kept constant at 240° C. during the entire transesterification step. Further reduced reaction pressure in the trans-esterification stage increases the IV build-up rate considerably and the consumption rate of CEG significantly. IV of 0.25 dl/g and CEG value of 9 mmol/kg are achieved in 63 min (FIGS. 1, 2). Very low reactor pressure leads to a sharp drop in CEG values. However, 240° C. is not enough to increase IV closer to specs. This example shows that the low reactor pressure is very crucial to achieve a lower CEG (<10 mmol/kg) and there is a need of higher transesterification temperature to increase IV build-up rate even further to meet specs.

TABLE 3

PBT Oligomers prepared at 1.8 mm Hg and 240° C.

| Entry # | Reactor Temp (° C.) | Pressure (mm of Hg) | Time (min) | IV (dl/g) | CEG (mmol/kg) |
|---|---|---|---|---|---|
| 22 | 240 | 760 | 0 (Clear Point) | 0.03 | 487 |
| 23 | 240 | 379 | 15 | 0.06 | 37 |

TABLE 3-continued

PBT Oligomers prepared at 1.8 mm Hg and 240° C.

| Entry # | Reactor Temp (° C.) | Pressure (mm of Hg) | Time (min) | IV (dl/g) | CEG (mmol/kg) |
|---|---|---|---|---|---|
| 24 | 240 | 68 | 30 | 0.09 | 16 |
| 25 | 240 | 1.8 | 45 | 0.19 | 5 |
| 26 | 240 | 1.8 | 63 | 0.25 | 9 |

Ester-Interchange Step: Temperature = 240° C., Pressure = 760 mm of Hg
Trans-Esterification: Temperature = 240° C., Pressure = 1.8 mm of Hg, RT = 18 minutes Example 4.4

Table 4.4 summarizes the PBT oligomers prepared through the trans-esterification stage, where the reactor pressure was reduced to 1.8 mm Hg for 60 minutes and held constant at 1.8 mm of Hg for 9 minutes. The melt temperature was increased to 250° C. after clearing point and kept constant at that temperature during the entire transesterification step. Further reduced reaction pressure and increase of the melt temperature in the trans-esterification stage increase the IV build-up rate considerably and the consumption rate of CEG significantly. IV of 0.28 dl/g and CEG value of 5 mmol/kg are achieved in 60 min (FIGS. 1, 2). Very low reactor pressure leads to a sharp drop in CEG values and stabilizes CEG at 5 mmol/kg for 24 minutes. This example shows that the low reactor pressure and the high transesterification temperature provide PBT oligomers within specs.

TABLE 4

PBT Oligomers prepared at 1.8 mm Hg and 250° C.

| Entry # | Reactor Temp (° C.) | Pressure (mm of Hg) | Time (min) | IV (dl/g) | CEG (mmol/kg) |
|---|---|---|---|---|---|
| 27 | 250 | 760 | 0 (Clear Point) | 0.03 | 536 |
| 28 | 250 | 281 | 15 | 0.08 | 27 |
| 29 | 250 | 72 | 30 | 0.10 | 10 |
| 30 | 250 | 3.7 | 45 | 0.18 | 5 |
| 31 | 250 | 1.8 | 60 | 0.28 | 5 |
| 32 | 240 | 1.8 | 69 | 0.35 | 5 |

Ester-Interchange Step: Temperature = 240° C., Pressure = 760 mm of Hg
Trans-Esterification: Temperature = 250° C., Pressure = 1.8 mm of Hg, RT = 9 minutes Example 2.5

Table 5 summarizes the PBT oligomers prepared through the trans-esterification stage, where the reactor pressure was reduced to 4.8 mm Hg for 45 minutes and held constant at 4.8 mm of Hg for 18 minutes. The melt temperature was increased to 250° C. after clearing point and kept constant at that temperature during the entire transesterification step. A slight increase of reaction pressure (from 1.8 mm Hg to 4.8 mm Hg) in the trans-esterification stage reduces slightly the consumption rate of CEG. IV of 0.41 dl/g and CEG value of 10 mmol/kg are achieved in 63 min (FIGS. 1, 2). Low reactor pressure and high melt temperature lead to a high IV build-up rate. This example shows that a slight increase of reactor pressure results in CEG value which is on the higher spec limit (10 mmol/kg). The high transesterification temperature increases IV build-up rate and exceeds specs in 63 min after clearing point.

TABLE 5

PBT Oligomers prepared at 4.8 mm Hg and 250° C.

| Entry # | Reactor Temp (° C.) | Pressure (mm of Hg) | Time (min) | IV (dl/g) | CEG (mmol/kg) |
|---|---|---|---|---|---|
| 33 | 250 | 760 | 0 (Clear Point) | 0.04 | 505 |
| 34 | 250 | 281 | 15 | 0.08 | 27 |
| 35 | 250 | 107 | 30 | 0.11 | 10 |
| 36 | 250 | 4.8 | 45 | 0.30 | 8 |
| 37 | 250 | 4.8 | 63 | 0.41 | 10 |

Ester-Interchange Step: Temperature = 240° C., Pressure = 760 mm of Hg
Trans-Esterification: Temperature = 250° C., Pressure = 4.8 mm of Hg, RT = 18 minutes Conclusion In conclusion:
The IV and CEG depend on trans-esterification temperature, trans-esterification pressure, and residence time.
The CEG concentration is a strong function of reaction pressure in trans-esterification step. Application of reduced pressure increases the kinetics of trans-esterification step there by increasing the CEG consumption rate.
Increased temperature during the trans-esterification stage provides conditions suitable to achieve the IV and CEG specifications.
The entire range for the IV and CEG specifications can be obtained by increasing trans-esterification reaction temperature and lowering reactor pressure to the lowest value.

Example 3: Batch Preparation of PBT Resin from PBT Oligomer

The materials and equipment were the same as in Example 1.

The PBT polymers were prepared at a lab scale in a 1 L 3-necked round bottom flask equipped with a condenser and a vacuum output. The reactor was immersed in an oil bath which temperature was controlled by a Camile system.

The PBT oligomer was prepared in the Helicone with a BDO to PTA mole ratio equal to 3:1, and were the repetition of previous trial. The reactor was charged with 6.8 kg (approximately 41.0 mole) of PTA, 11.3 kg (approximately 125 mole) of BDO, and 6.0 ml of TPT at 170° C. under a nitrogen atmosphere. The agitator speed was set at 67% of maximum. The temperature was raised to 240° C. with a ramp rate of 2° C. per minute. The ester interchange (EI) reaction was run at 240° C. During the EI stage, the condensed overhead from the reactor was allowed to reflux back to the reactor. After the clearing point was reached, the temperature is increased to 260° C. and held constant. Finally, the reaction was stopped at 90 minutes, and the polymer sample was obtained for analysis (IV and CEG).

The PBT resin in Example 2.1 was prepared from PBT oligomer in a lab scale reactor. 100 g of PBT oligomer was introduced into a three-neck round bottom flask. The reactor was placed in an oil bath with the temperature adjusted to 250° C. The PBT oligomer was melted at that temperature in 10 minutes while stirring at 260 rpm under nitrogen. After achieving a complete melt, the polymerization stage was conducted at the same temperature with the vacuum adjusted to less than 1 mm Hg for approximately 30 minutes. Finally, the reaction was stopped, pressure increased to atmospheric pressure, and the polymer sample was obtained for analysis (IV and CEG).

The PBT resin in Example 2.2 was prepared from PBT oligomer in a lab scale reactor. 100 g of PBT oligomer was introduced into a three-neck round bottom flask. The reactor was placed in an oil bath with the temperature adjusted to 250° C. The PBT oligomer was melted at that temperature in 10 minutes while stirring at 260 rpm under nitrogen. After achieving a complete melt, 50 ppm of TPT was added under nitrogen and the polymerization stage was conducted at the same temperature with the vacuum adjusted to less than 1 mm Hg for approximately 30 minutes. Finally, the reaction was stopped, pressure increased to atmospheric pressure, and the polymer sample was obtained for analysis (IV and CEG).

The PBT resin in Example 2.3 was prepared from PBT oligomer in a lab scale reactor. 100 g of PBT oligomer was introduced into a three-neck round bottom flask. The reactor was placed in an oil bath with the temperature adjusted to 250° C. The PBT oligomer was melted at that temperature in 10 minutes while stirring at 260 rpm under nitrogen. After achieving a complete melt, 5 g (5 weight %) of BDO was added under nitrogen and the polymerization stage was conducted at the same temperature with the vacuum adjusted to less than 1 mm Hg for approximately 30 minutes. Finally, the reaction was stopped, pressure increased to atmospheric pressure, and the polymer sample was obtained for analysis (IV and CEG).

The PBT resin in Example 2.4 was prepared from PBT oligomer in a lab scale reactor. 100 g of PBT oligomer was introduced into a three-neck round bottom flask. The reactor was placed in an oil bath with the temperature adjusted to 250° C. The PBT oligomer was melted at that temperature in 10 minutes while stirring at 260 rpm under nitrogen. After achieving a complete melt, 50 ppm of TPT and 5 g of BDO were added under nitrogen and the polymerization stage was conducted at the same temperature with the vacuum adjusted to less than 1 mm Hg for approximately 30 minutes. Finally, the reaction was stopped, pressure increased to atmospheric pressure, and the polymer sample was obtained for analysis (IV and CEG).

General Testing of PBT Oligomers:

The IV and CEG of oligomers were tested as provided in Example 1.

Discussion

The primary objective of the study is to determine process conditions required to produce PBT polymers having IV greater than 0.8 dl/g from PTA based PBT oligomers having IV of 0.15 dl/g and CEG of 98 mmol/kg. There are two main steps in the preparation of desired PBT polymer from PTA based PBT oligomer in a lab scale single batch process. First step is the melting process which is carried at 250° C. until a homogeneous melt is achieved. The second step is polycondensation process where IV increases with residence time in the reactor. In all runs, the polycondensation process conditions were kept constant (process temperature: 250° C.; process pressure: <1 mm Hg). Variables for the process optimizations were: addition of extra polycondensation catalyst and extra BDO. For each trial, the overhead composition during the direct esterification step involves the production of BDO, THF, and $H_2O$.

PBT Oligomers:

The PBT oligomer was prepared in a pilot plant. The BDO to PTA mole ratio was equal to 3:1. The ester interchange (EI) reaction was run at 240° C. During the EI stage, the condensed overhead from the reactor was allowed to reflux back to the reactor. After the clearing point was reached, the temperature is increased to 260° C. and held constant, approximately 90 minutes after clearing point, IV of 0.16 dl/g and a CEG of 98 mmol/kg were achieved (Table 3.1). The oligomer melt was dropped on aluminum pan and grinded into fine particle to be used for the polymerization process.

TABLE 3.1

PBT Polymers Prepared at Less Than 1 mm Hg and 250° C.

| Polymer | Time (min) | IV (dl/g) | CEG (mmol/kg) |
| --- | --- | --- | --- |
| PBT Oligomer | NA | 0.16 | 98 |
| Example 3.1 | 67 | 0.82 | 9 |
| Example 3.2 | 30 | 0.87 | 7 |
| Example 3.3 | 96 | 0.89 | 8 |
| Example 3.4 | 34 | 0.92 | 6 |

Example 3.1

Example 3.1 was prepared through melting the PBT oligomer in a glass reactor under nitrogen atmosphere. The glass reactor was immersed in an oil batch which temperature was adjusted to 250° C. The melting process takes about 10 minutes. After achieving the complete homogeneous melt, the process pressure was reduced to below 1 mm Hg while keeping the oil temperature at 250° C. After reaching enough viscosity, the vacuum was stopped and polymer melt was sampled for IV and CEG analysis. As Table 3.1 shows, the entire polycondensation takes place in 67 minutes. IV of 0.82 dl/g and CEG of 9 mmol/kg were achieved. The low CEG value indicates that the polycondensation favorably occurs at the chain end and reduces CEG significantly.

Example 2.2

Example 3.2 was prepared through melting the PBT oligomer in a glass reactor under nitrogen atmosphere. The glass reactor was immersed in an oil batch which temperature was adjusted to 250° C. The melting process takes about 10 minutes. After achieving the complete homogeneous melt, an additional catalyst (50 ppm) was added and the process pressure was reduced to below 1 mm Hg while keeping the oil temperature at 250° C. In this example, the effect of catalyst addition before the polycondensation step was explored. As Table 3.1 shows, the entire polycondensation takes place in 30 minutes which is significantly lower compare to previous example. IV of 0.87 dl/g and CEG of 7 mmol/kg were achieved. The addition of extra catalyst increases the polycondensation rate almost two times. The low CEG value was obtained indicating that chain grows through end group which lowers CEG while increasing the molecular weight.

Example 3.3

Example 3.3 was prepared through melting the PBT oligomer in a glass reactor under nitrogen atmosphere. The glass reactor was immersed in an oil batch which temperature was adjusted to 250° C. The melting process takes about 10 minutes. After achieving the complete homogeneous melt, an additional BDO (5 g) was added into the melt and the process pressure was reduced to below 1 mm Hg while keeping the oil temperature at 250° C. In this example, the effect of BDO addition before the polycondensation step was explored. As Table 3.1 shows, the entire polycondensation takes place in 96 minutes which is significantly higher compare to Example 3.1 and Example 3.2. IV of 0.89 dl/g and CEG of 8 mmol/kg were achieved. The addition of extra BDO decreases the polycondensation rate almost one and half times. The addition of extra BDO did not affect the process chemistry in terms of CEG, which shows a low value indicating a step growth mechanism through chain end.

Example 3.4

Example 3.4 was prepared through melting the PBT oligomer in a glass reactor under nitrogen atmosphere. The glass reactor was immersed in an oil batch which temperature was adjusted to 250° C. The melting process takes about 10 minutes. After achieving the complete homogeneous melt, an additional catalyst (50 ppm) and BDO were added and the process pressure was reduced to below 1 mm Hg while keeping the oil temperature at 250° C. In this example, the effects of catalyst and BDO addition before the polycondensation step were explored. As Table 3.1 shows, the entire polycondensation takes place in 34 minutes which signifies that catalyst addition is more effective and dominating the reaction rate. IV of 0.92 dl/g and CEG of 6 mmol/kg were achieved. The addition of extra catalyst and BDO decreases the CEG value while growing molecular weight.

In conclusion:
- The IV and CEG depend on trans-esterification temperature, trans-esterification pressure, and residence time.
- The addition of extra catalyst decreases the residence time of the transesterification with an increase of IV build-up rate and CEG consumption rate.
- The addition of extra BDO increases the residence time with a decrease of IV build-up rate.

Example 4: Continuous Process for Making PBT Resin from PBT Oligomer

A continuous pilot plant was used for the process of preparing PBT resins. The continuous pilot plant design is given in FIG. 1. The design includes an oligomer feeder (XO610), a melt tank (B1620, 75 L), a Continuous Stirred-Tank Reactor ("CSTR", C2210, 820 L), and a Disc-Ring reactor ("DRR", C5610, 1200 L). A transfer pipe line (P2210A) equipped with a melt pump connects the melt tank and CSTR. There is a sampling loop just before the CSTR tank where there is an online capillary pressure drop viscometer. Another transfer pipeline (P4610) equipped with a melt pump and online viscometer connects the CSTR and DRR. A vacuum system is used to reduce the pressure in CSTR and DRR. There is additional butanediol and catalyst feed lines connected to the CSTR.

The continuous process parameters are given in Table 4.1.

TABLE 4.1

| | Process Parameters | | | | | |
|---|---|---|---|---|---|---|
| | Melt TK | Transfer | CSTR | Transfer | DRR | Prod. |
| Temp ° C. | 220-250 | 220-270 | 230-270 | 230-270 | 230-270 | 230-270 |
| Press mBar | 1000 | Max. 15 bars (abs) | 5 atm | 12 bars | 0.8-1.6 | Max. 250 bars (abs) |
| Flow Rate Kg/hr | 50-111 | 50-111 | 50-111 | 50-111 | 50-111 | 50-111 |
| Process Vol, L | 50-62 | n/a | 100-300 | n/a | *-440 | n/a |
| Residence Time, hr | 0.33-1.36 (Low Flow) 0.15-0.61 (High Flow) | Short as feasible | 2.2-6.6 (Low Flow) 1.0-3.0 (High Flow) | Short as feasible | *-9.6 (Low Flow) *-4.3 (High Flow) | Short as feasible |

In the continuous process, the solid PBT oligomers having intrinsic viscosity (IV) between 0.13 and 0.17 dL/g and carboxylic acid end group concentration (CEG) between 100 and 220 mmol/kg are converted into a melt by heating at between 220 and 250° C. and 1000 mbar. The flow rate is in the range between 50 and 111 kg/hr and the process volume fluctuates between 15 and 62 L. The residence time in the melt tank is between 0.61 hour for high flow and 1.36 hour for low flow.

A process flow line transfers melted PBT oligomers into the CSTR. The process flow line is equipped with a capillary pressure drop viscometer which monitors online the IV of the melt oligomer feeding to the CSTR. The pipeline melt temperature is between 220 and 270° C. The pressure in the transfer line is at a maximum of 15 mbars and the flow rate fluctuates between 50 and 111 kg/hr.

The melted oligomers are fed into the CSTR and the melt temperature is adjusted between 230 and 270° C. The pressure is kept between 40 mbar and 5 mbar. The residence time is varied between 3 and 6.6 hours.

A second process flow line transfers melted PBT oligomers from the CSTR into the DRR. The process flow line is equipped with a capillary pressure drop viscometer which monitors online the IV of the melt oligomer feeding to the DRR. The pipeline melt temperature was between 230 and 270° C. The pressure in the transfer line is at a maximum of 15 mbars and the flow rate was changing between 50 and 111 kg/hr.

Finally, PBT resins are produced continuously in DRR reactor, C5610. The PBT melt temperature was kept between 230 and 270° C. The reactor pressure was varied between 0.8 and 5 mbar for different grades. The flow rate was carried between 50 and 111 kg/hr. Total residence time based on grades was varied between 4.3 and 9.6 hours.

PBT Resin Grades

Three resin grades were produced in the continuous pilot plant by varying the process parameters in CSTR and DRR. The IV, CEG, and melt viscosity (MV) properties of resulting resin are given in Table 4.2.

TABLE 4.2

Properties of PBT Grades Delivered from Continuous Pilot Plant.

| PBT Grades | IV (dL/g) | | CEG (mmol/kg) | | MV (Poise) | |
|---|---|---|---|---|---|---|
| | Low | High | Low | High | Low | High |
| PBT 315 | 1.10 | 1.25 | 35 | 45 | 7500 | 9500 |
| PBT 195 | 0.68 | 0.72 | | 24 | 740 | 900 |
| PBT 176 | 0.55 | 0.59 | | 12 | 200 | 400 |

General Testing of PBT

The IV of oligomers was measured using an automatic Viscotek Microlab® 500 series Relative Viscometer Y501. 0.5 grams of oligomer sample was fully dissolved in a 60 to 40 mixture (% volume) of phenol and 1,1,2,2-tetrachloroethane solution (Harrell Industries). Two measurements were taken for each sample, and the reported result was the average of the two measurements.

The CEG concentration of oligomers was measured using Metrohm-Autotitrator including Titrando 907, 800 Dosino, 2 ml and 5 ml dosing units and 814 USB sample processor. All the units are controlled from a PC using Tiamo 2.0 Full version. 1.5-2.0 grams of oligomer was fully dissolved in 50 ml of O-cresol solvent at 80° C. After dissolving, the sample was cooled to room temperature and 50 ml of O-cresol and 1 ml of water were added to the beaker. Sample blank was prepared in the similar way. The electrodes and titrant dosino were dipped into the sample solution and the titration was started. The sample titration was repeated twice and the equivalence point was noted for the calculation of CEG value.

Melt viscosity was determined as a function of time at 265° C. for 30 minutes. This test is also known as "time-sweep". Percent viscosity change was reported.

The invention claimed is:

1. A process for preparing polybutylene terephthalate (PBT), comprising polycondensation of PBT oligomer having an IV of between 0.13 and 0.17 dL/g and a CEG of between 90 and 180 mmol/kg; wherein the polycondensation process is carried out continuously using equipment comprising: a melt tank for melting oligomers, one or more reactors for post-condensation processing, and one or more finishing reactors to increase molecular weight; and wherein:

the resulting PBT has an intrinsic viscosity (IV) of between 0.5 and 1.3 dl/g and a carboxylic end group (CEG) concentration of between 1 and 75 mmol/kg.

2. The process of claim 1, wherein the equipment comprises a melt tank with agitation reactor for melting the oligomer, a continuously stirred tank reactor (CSTR) for post condensation processing, and a disc ring reactor (DRR) to increase the molecular weight of the PBT.

3. The process of claim 2, wherein the PBT oligomer is added to the melt tank as solid PBT oligomer, wherein the solid PBT oligomer is pelletized, powdered or flaked.

4. The process of claim 3, wherein the solid flaked PBT oligomer is melted to form a melt by heating the melt reactor to between 220 and 250° C. and 1000 mbar, and wherein the resulting melted PBT oligomer has a residence time in the melt tank of between 0.2 and 1.5 hour.

5. The process of claim 4, Wherein the PBT melt is transferred using a transfer pipe to the CSTR, wherein the pipeline melt temperature is between 220 and 270° C., a pressure of 10 mbars.

6. The process of claim 5, wherein the melt temperature in the CSTR is 225 and 270° C. and the pressure is adjusted to between 40 and 5 mbar and the residence time of the PBT is between 40 and 150 minutes.

7. The process of claim 6, wherein the catalyst and optionally BDO are added to the CSTR.

8. The process of claim 7, wherein the catalyst is tetraisopropyl titanate.

9. The process of claim 8, wherein the contents of the CSTR are transferred using a transfer pipe to the DRR, wherein the pipeline melt temperature is between 230 and 270° C.

10. The process of claim 9, wherein the DRR has two shafts with the first shaft having more disc rings than the second shaft, where the two shafts operate at different rpm.

11. The process of claim 10, wherein the first shaft of the DRR has 6 disc rings and the second shaft has 3 or 4 disc rings.

12. The process of claim 10, wherein the first shaft rotates at 4 to 10 rpm and has a tip speed between 0.40 and 0.70 m/s and the distance between the rings of the first shaft is between 60 and 90 mm; and the second shaft rotates at 2.2 to 5.5 rpm and has a tip speed between 0.20 and 0.50 m/s, and the distance between the rings of the second shaft is between 100 and 130 mm.

13. The process of claim 12, wherein PBT is produced continuously in the DRR, wherein the PBT melt temperature in the DRR is kept between 230 and 270° C., the pressure varies between approximately 0.8 and 10 mbar, the average volume fill is between 10 and 35 percent, and the total residence time of the PBT in the processor is between 4.3 and 15 hours.

14. The process of claim 13, wherein the DRR produces PBT with an IV of greater than 0.55 dl/g and a CEG of between 5 and 75 mmol/kg, a residence time in the DRR ranging from 78 minutes up to 240 minutes, and a process throughput from 60 to 111 kg/hr that is equivalent to a DRR average volume fill equal to 10 and 35 percent.

* * * * *